United States Patent
Miwa et al.

(10) Patent No.: US 11,714,292 B2
(45) Date of Patent: Aug. 1, 2023

(54) OPTICAL SYSTEM, OPTICAL APPARATUS, AND METHOD FOR MANUFACTURING OPTICAL SYSTEM

(71) Applicant: Nikon Corporation, Tokyo (JP)

(72) Inventors: Satoshi Miwa, Yokohama (JP); Hiroshi Yabumoto, Yokohama (JP)

(73) Assignee: Nikon Corporation, Tokyo (JP)

( * ) Notice: Subject to any disclaimer, the term of this patent is extended or adjusted under 35 U.S.C. 154(b) by 68 days.

(21) Appl. No.: 16/495,805

(22) PCT Filed: Mar. 9, 2018

(86) PCT No.: PCT/JP2018/009159
§ 371 (c)(1),
(2) Date: Sep. 19, 2019

(87) PCT Pub. No.: WO2018/180359
PCT Pub. Date: Oct. 4, 2018

(65) Prior Publication Data
US 2020/0026094 A1    Jan. 23, 2020

(30) Foreign Application Priority Data

Mar. 28, 2017  (JP) .................................. 2017-062544

(51) Int. Cl.
*G02B 27/42* (2006.01)
*G02B 15/14* (2006.01)
(Continued)

(52) U.S. Cl.
CPC ...... *G02B 27/4211* (2013.01); *G02B 15/1461* (2019.08); *G02B 15/143101* (2019.08);
(Continued)

(58) Field of Classification Search
CPC ............ G02B 27/4211; G02B 15/1461; G02B 15/143101; G02B 15/20; G02B 27/4216;
(Continued)

(56) References Cited

U.S. PATENT DOCUMENTS 6,124,981 A     9/2000  Ogawa
2004/0252380 A1*  12/2004  Kashima ................ G02B 21/02
                                                      359/656

(Continued)

FOREIGN PATENT DOCUMENTS

JP    H06-194571 A    7/1994
JP    H11-183800 A    7/1999
(Continued)

OTHER PUBLICATIONS

Notice of Reasons for Rejection dated May 20, 2020, in Japanese Patent Application No. 2019-509149.
(Continued)

*Primary Examiner* — Stephone B Allen
*Assistant Examiner* — Gabriel A Sanz
(74) *Attorney, Agent, or Firm* — Potomac Law Group, PLLC

(57) ABSTRACT

[Problem to be Solved]
There are provided an optical system having good imaging performance, an optical apparatus, and a method for manufacturing the optical system.
[Solution]
An optical system OL used in an optical apparatus, such as a camera 1, includes a diffractive optical element GD and at least one specific lens Lp, which is a lens made of crystalline glass. The specific lens Lp satisfies the condition expressed by the following expression: $\theta gFp + 0.0017 \times vdp < 0.730$, where $\theta gFp$ represents partial dispersion ratio of a medium
(Continued)

of the specific lens Lp, and vdp represents the Abbe number of the medium of the specific lens Lp at a d line.

23 Claims, 20 Drawing Sheets

(51) Int. Cl.
*G02B 15/20* (2006.01)
*G02B 27/64* (2006.01)
(52) U.S. Cl.
CPC ......... *G02B 15/20* (2013.01); *G02B 27/4216* (2013.01); *G02B 27/646* (2013.01)
(58) Field of Classification Search
CPC .... G02B 27/646; G02B 9/64; G02B 27/4205; G02B 13/02; G02B 15/167; G02B 27/42
See application file for complete search history.

(56) References Cited

U.S. PATENT DOCUMENTS

| | | | |
|---|---|---|---|
| 2007/0091467 | A1 | 4/2007 | Yasui |
| 2013/0100337 | A1 | 4/2013 | Eguchi |
| 2013/0107365 | A1* | 5/2013 | Kanazashi ............ G02B 27/64 |
| | | | 359/557 |
| 2013/0194487 | A1* | 8/2013 | Eguchi ............... G02B 27/4211 |
| | | | 348/360 |
| 2015/0043087 | A1* | 2/2015 | Sudoh ............ G02B 15/144109 |
| | | | 359/688 |
| 2015/0212303 | A1* | 7/2015 | Ohashi .......... G02B 15/144109 |
| | | | 348/240.3 |
| 2016/0341958 | A1 | 11/2016 | Eguchi |

FOREIGN PATENT DOCUMENTS

| | | |
|---|---|---|
| JP | 2004-317749 A | 11/2004 |
| JP | 2007-121440 A | 5/2007 |
| JP | 2009-198961 A | 9/2009 |
| JP | 2013-092575 A | 5/2013 |
| JP | 2013-156405 A | 8/2013 |
| JP | 2014-109700 A | 6/2014 |
| JP | 2015-232662 A | 12/2015 |
| JP | 2016-200685 A | 12/2016 |
| JP | 2016-218276 A | 12/2016 |

OTHER PUBLICATIONS

English Translation of Written Opinion of the International Searching Authority from International Patent Application No. PCT/JP2018/009159, dated Jun. 12, 2018.
Notice of Reasons for Rejection dated Mar. 23, 2021, in Japanese Patent Application No. 2018-042595.
Office Action issued Jan. 28, 2021 in Chinese Patent Application No. 201880016146.1.
Notice of Reasons for Rejection dated Aug. 27, 2020, in Japanese Patent Application No. 2018-042595.
International Search Report from International Patent Application No. PCT/JP2018/009159, dated Jun. 12, 2018.
Written Opinion of the International Searching Authority from International Patent Application No. PCT/JP2018/009159, dated Jun. 12, 2018.

* cited by examiner

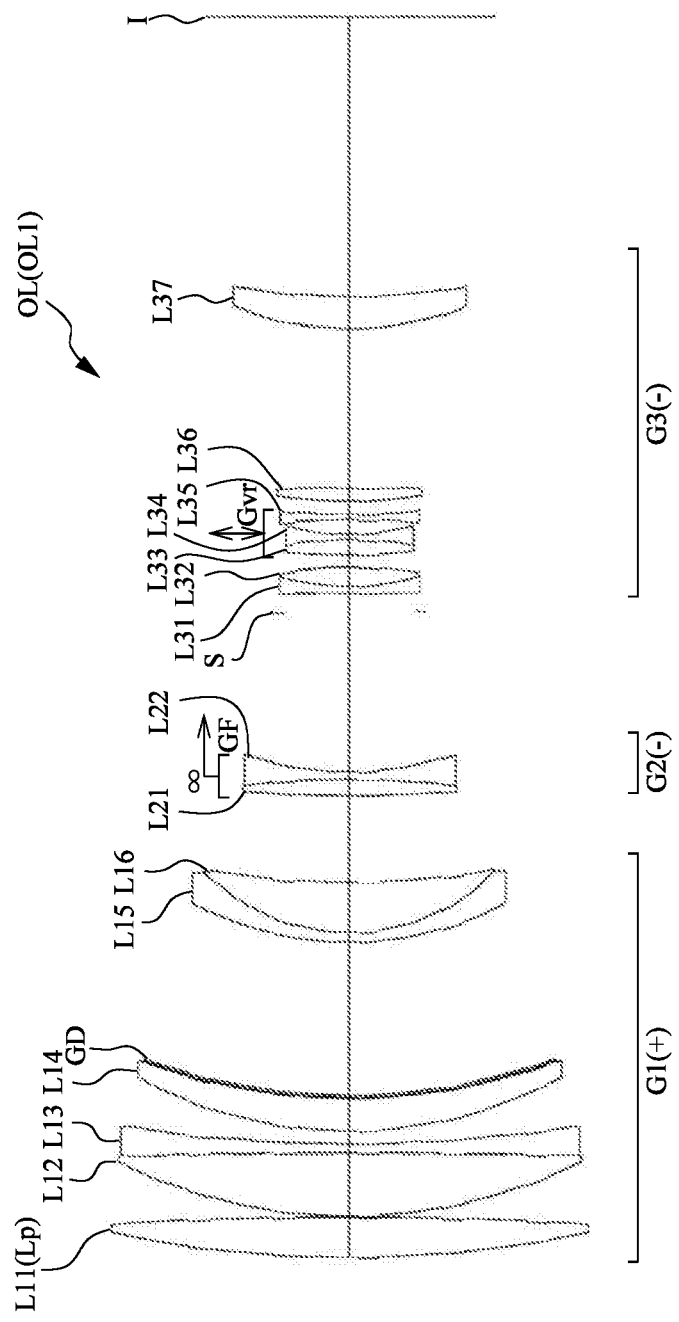
[FIG. 1]

[FIG. 2]
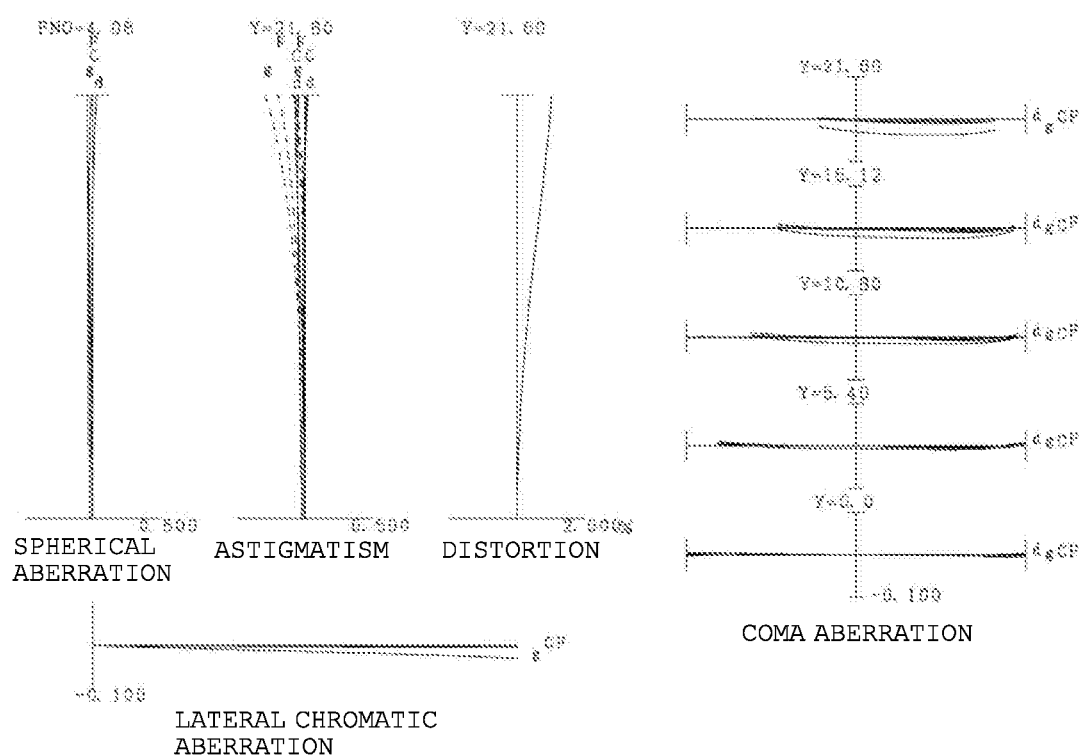

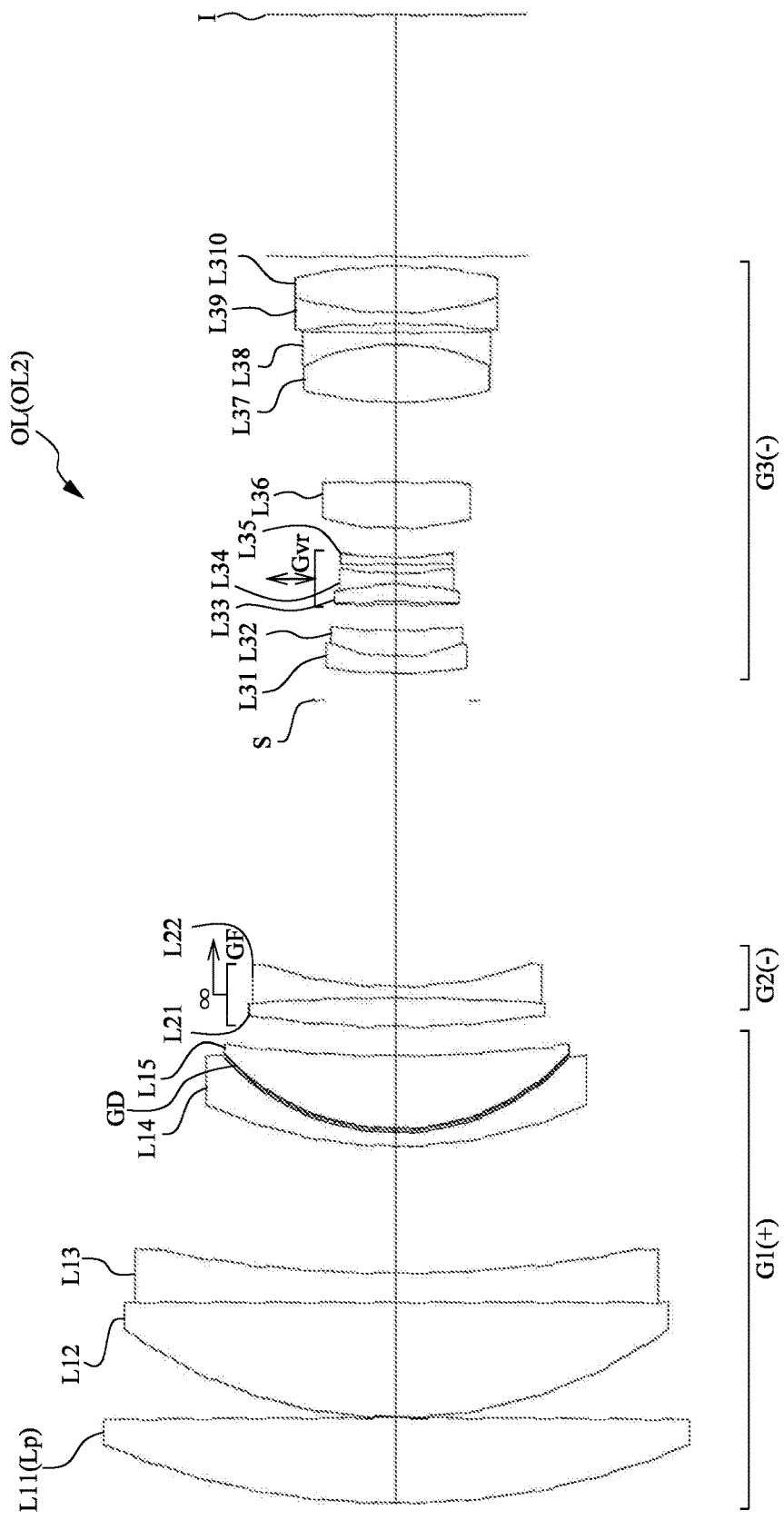
[FIG. 3]

[FIG. 4]
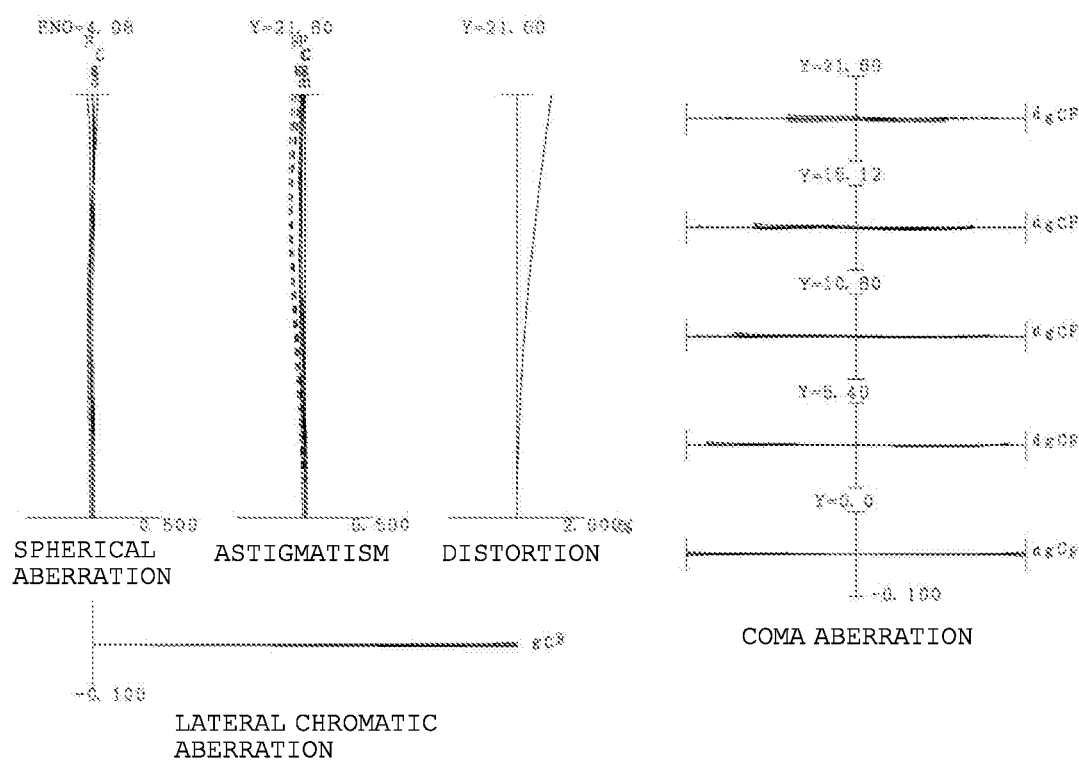

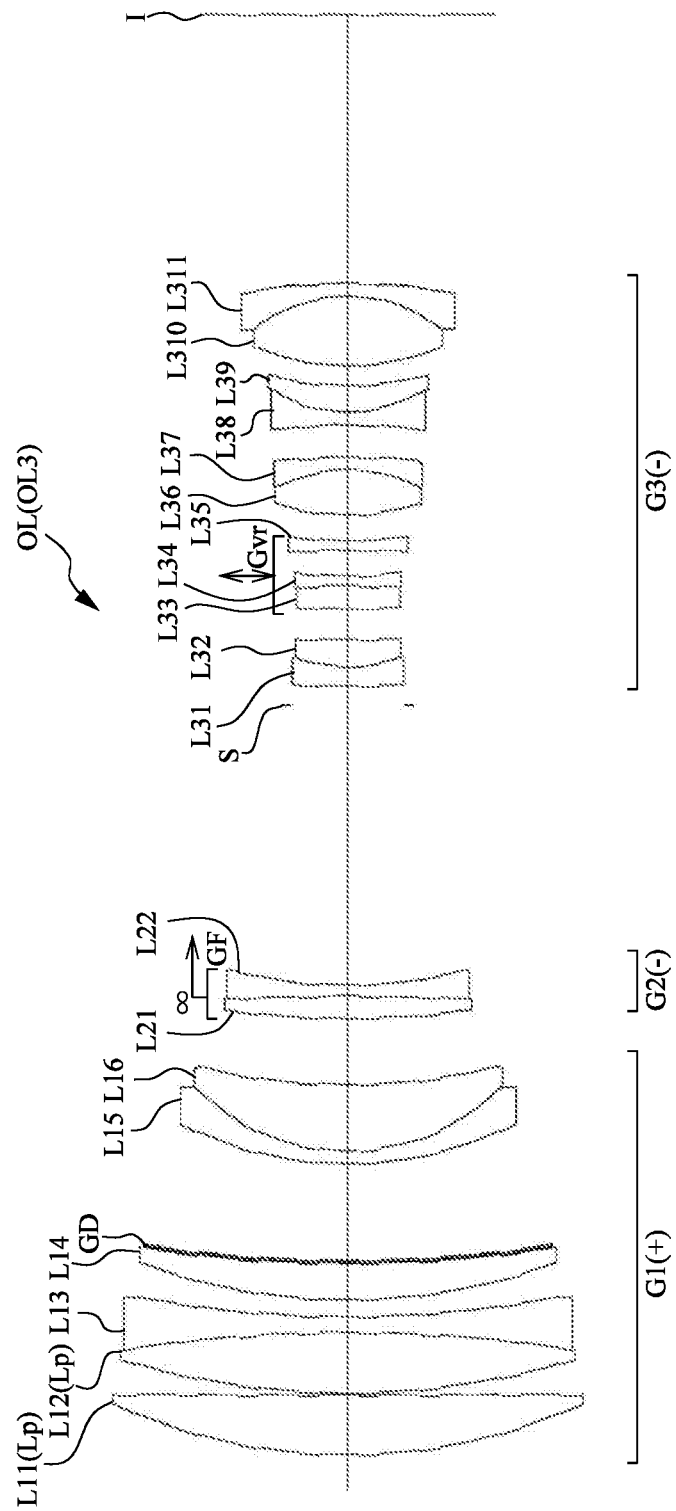
[FIG. 5]

[FIG. 6]
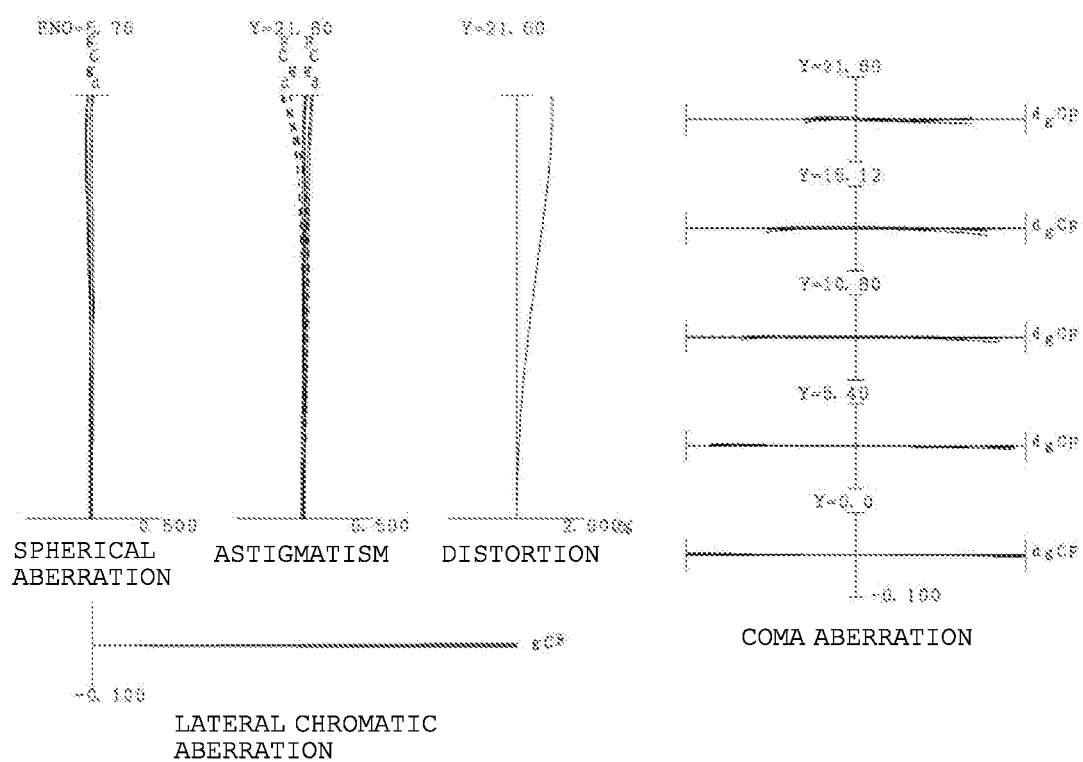

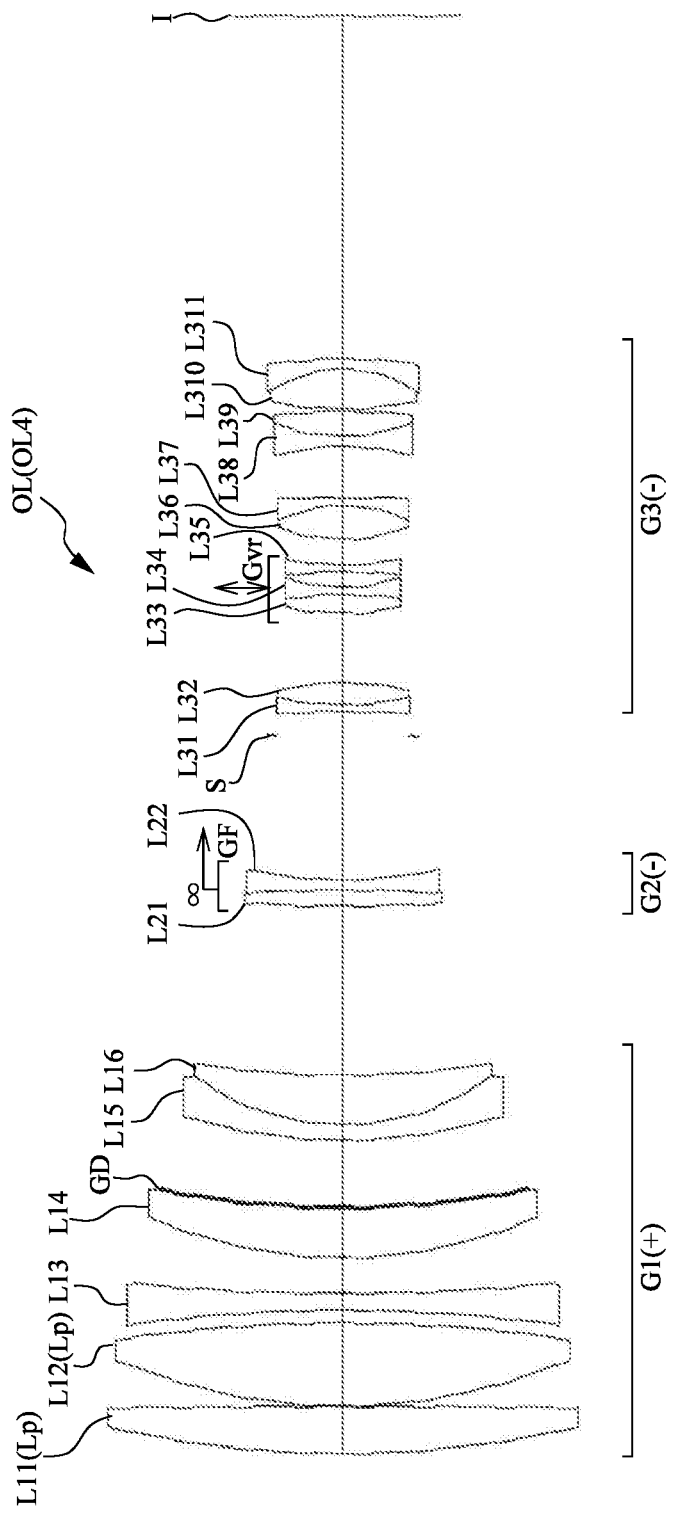

[FIG. 8]
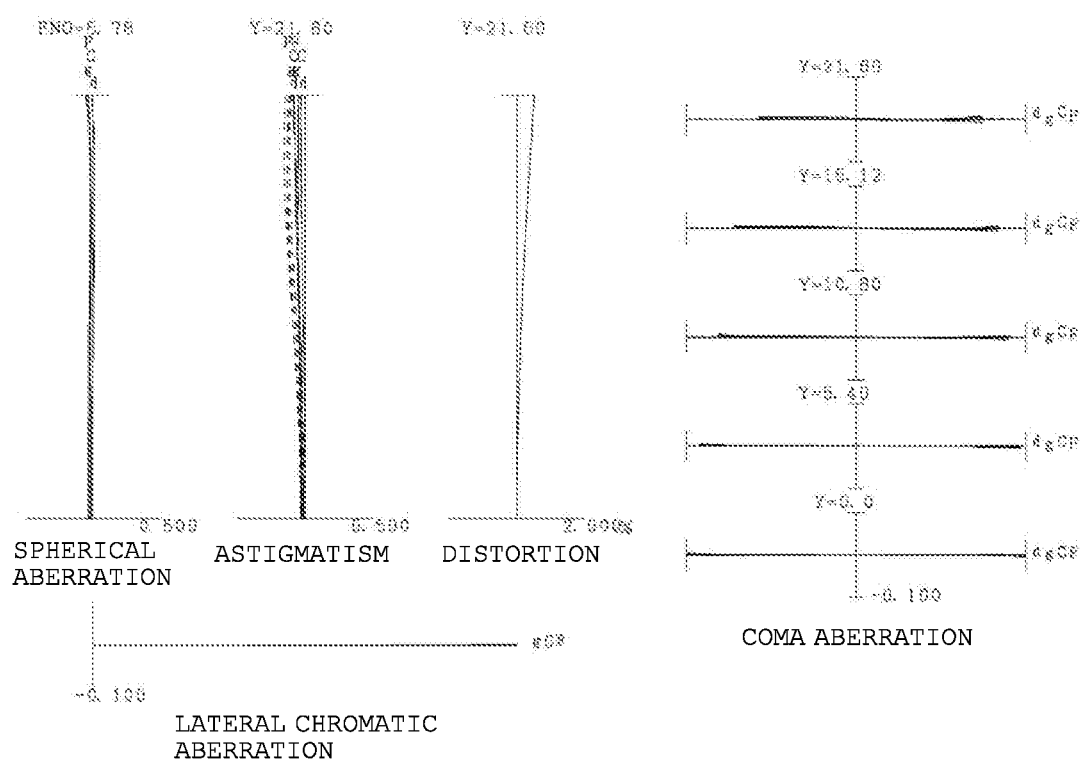

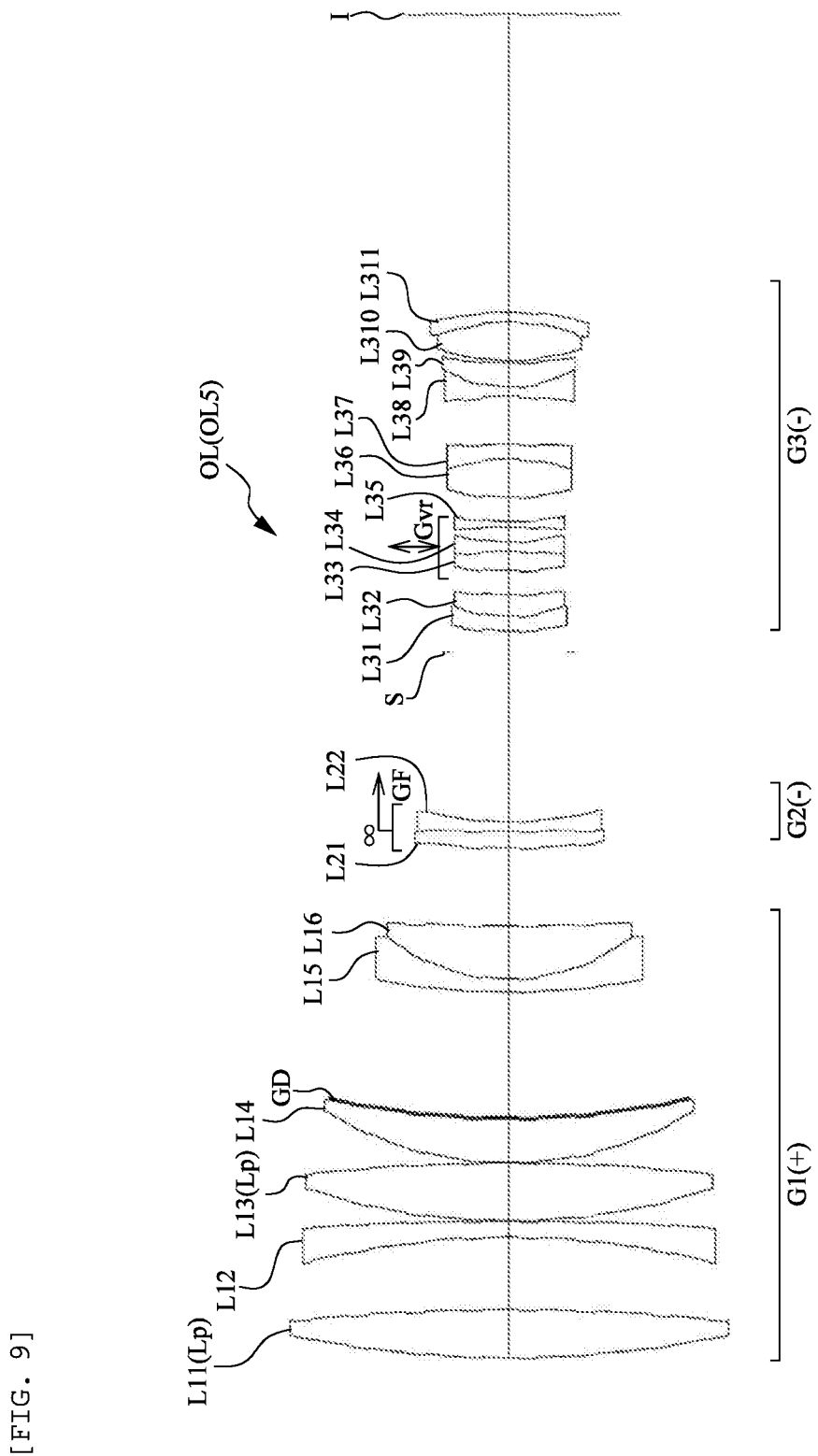
[FIG. 9]

[FIG. 10]
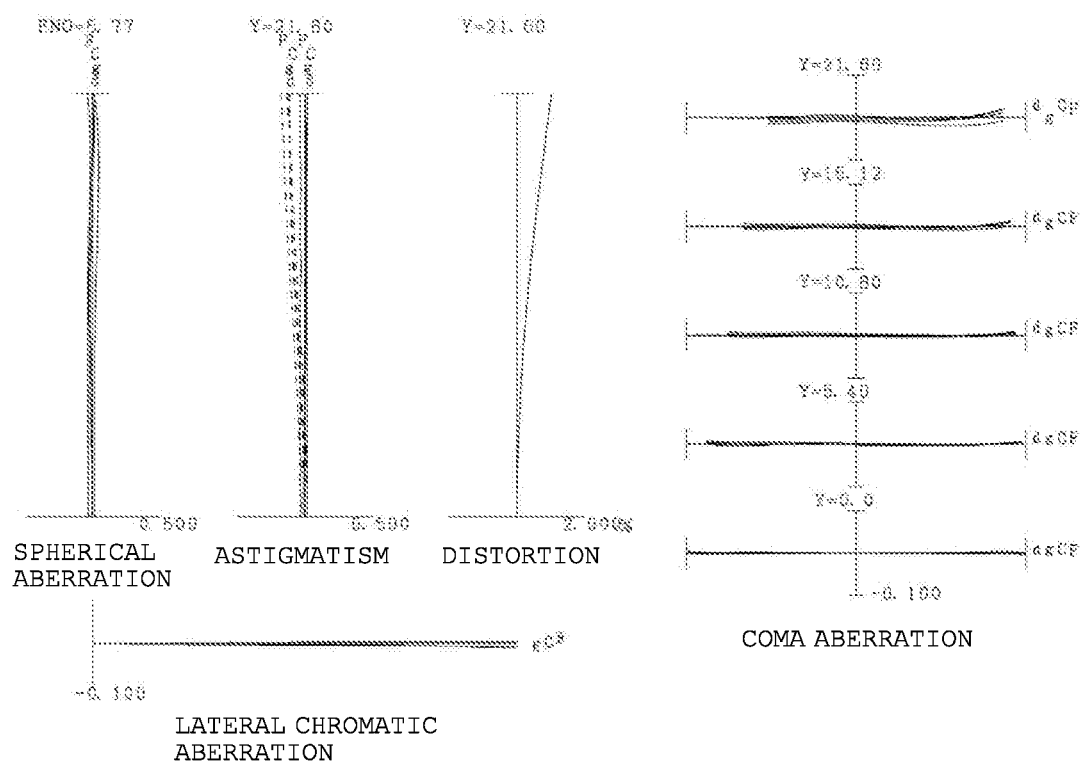
SPHERICAL ASTIGMATISM DISTORTION
ABERRATION
LATERAL CHROMATIC
ABERRATION
COMA ABERRATION

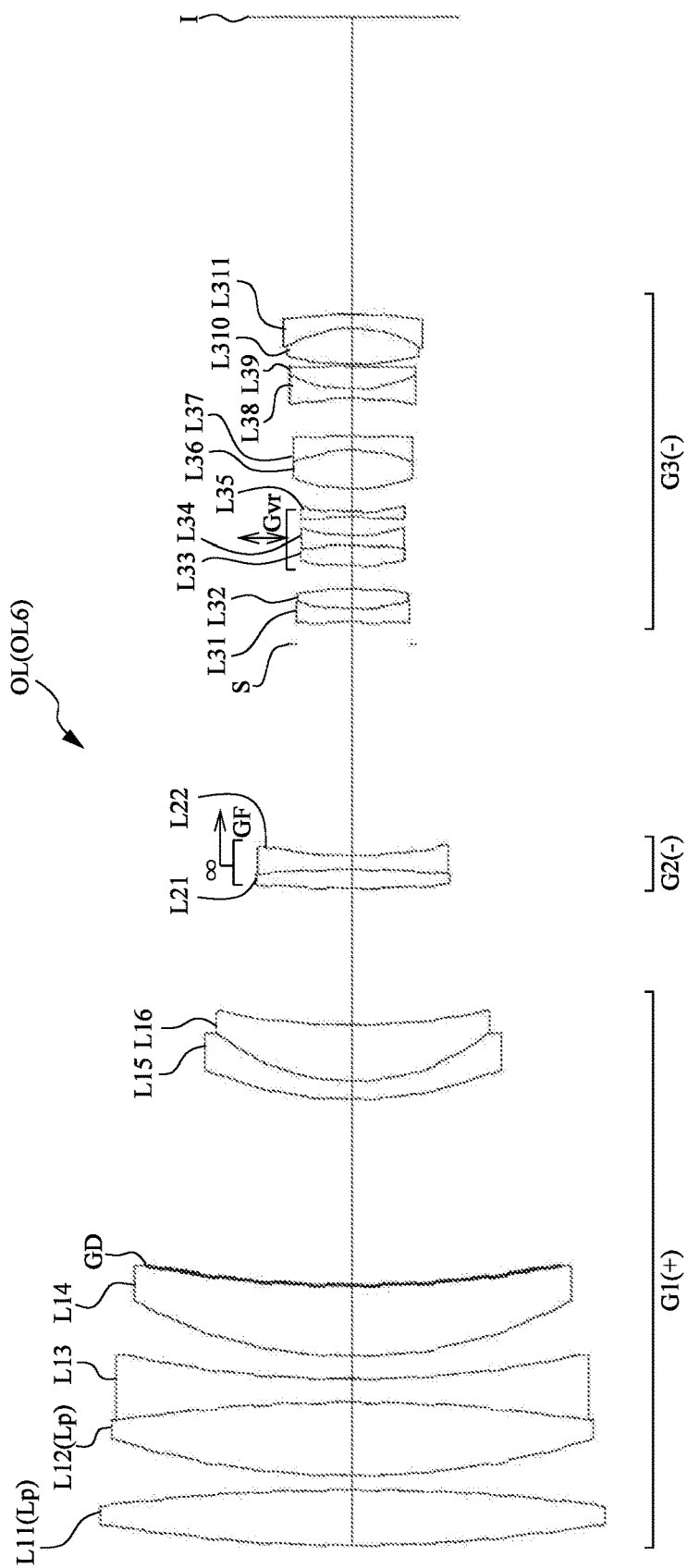
[FIG. 11]

[FIG. 12]
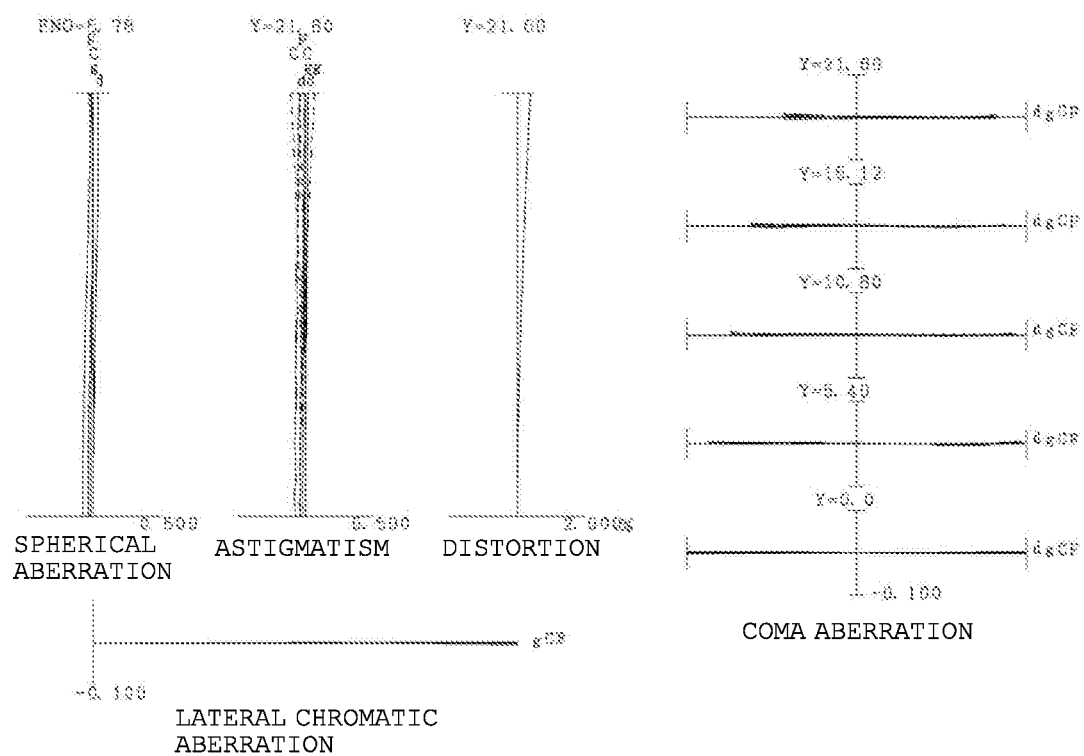

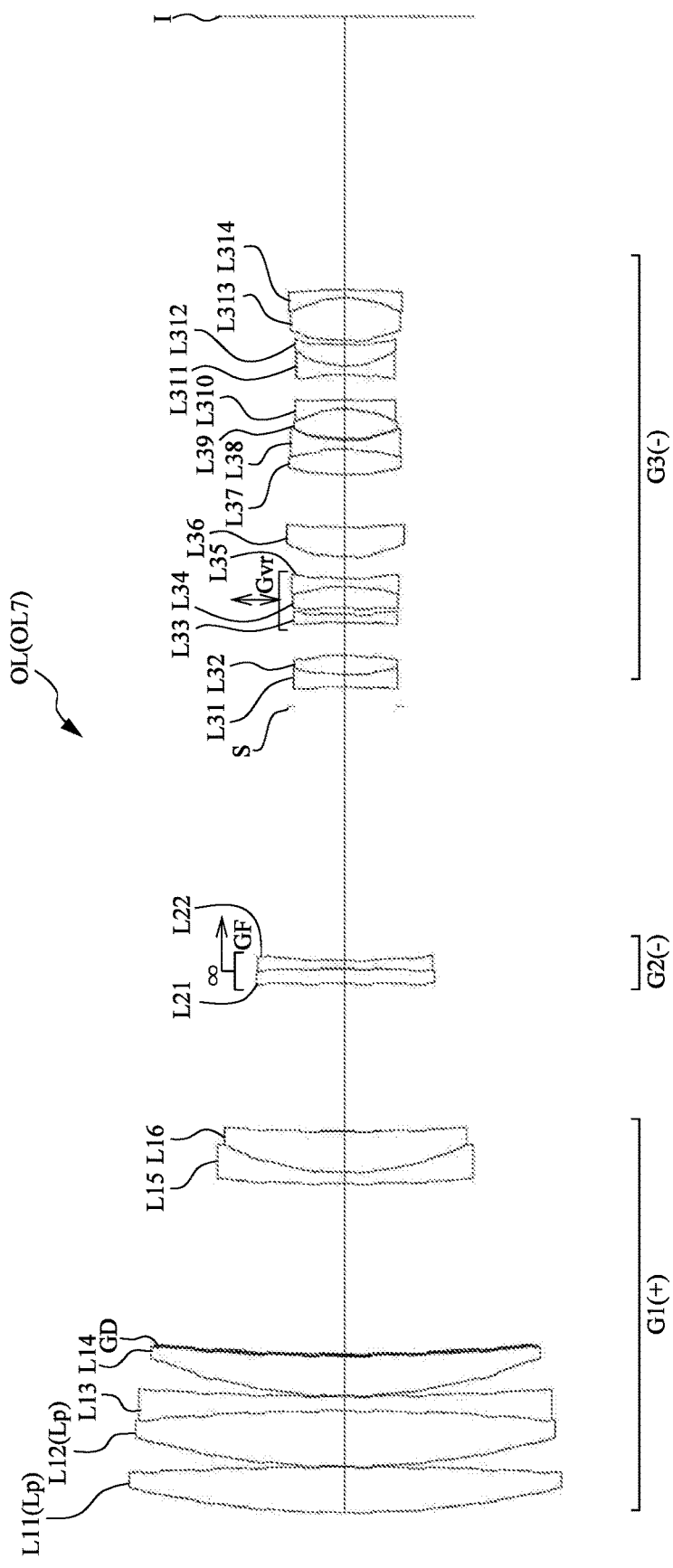
[FIG. 13]

[FIG. 14]
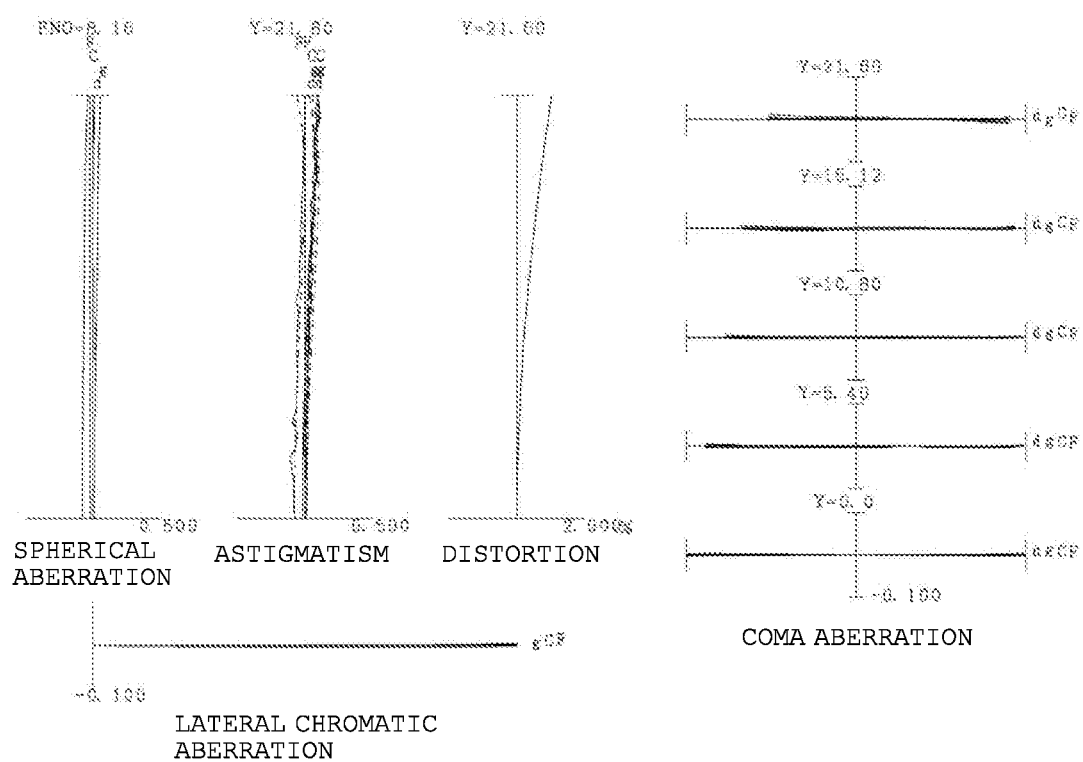

[FIG. 15]
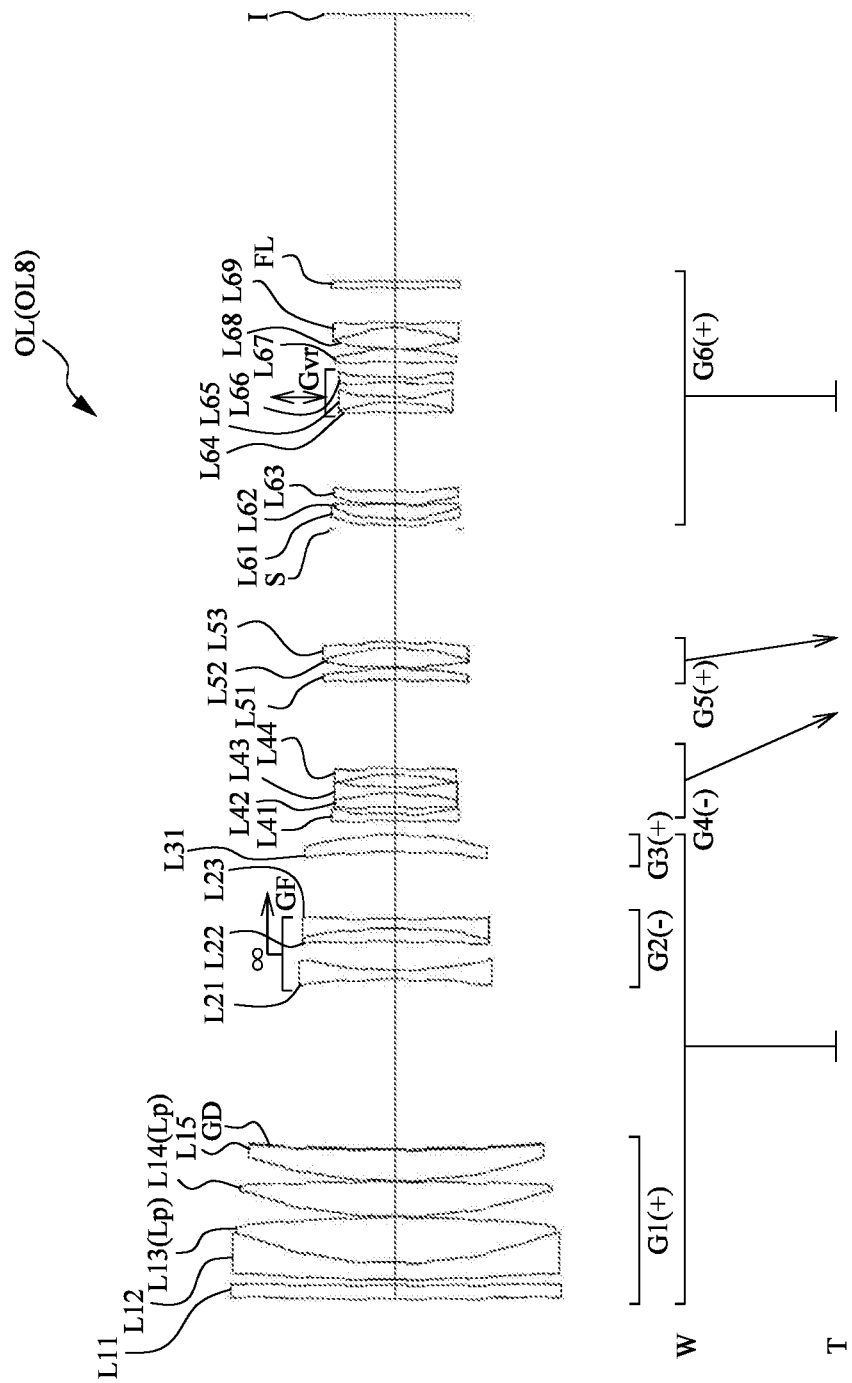

[FIG. 16]
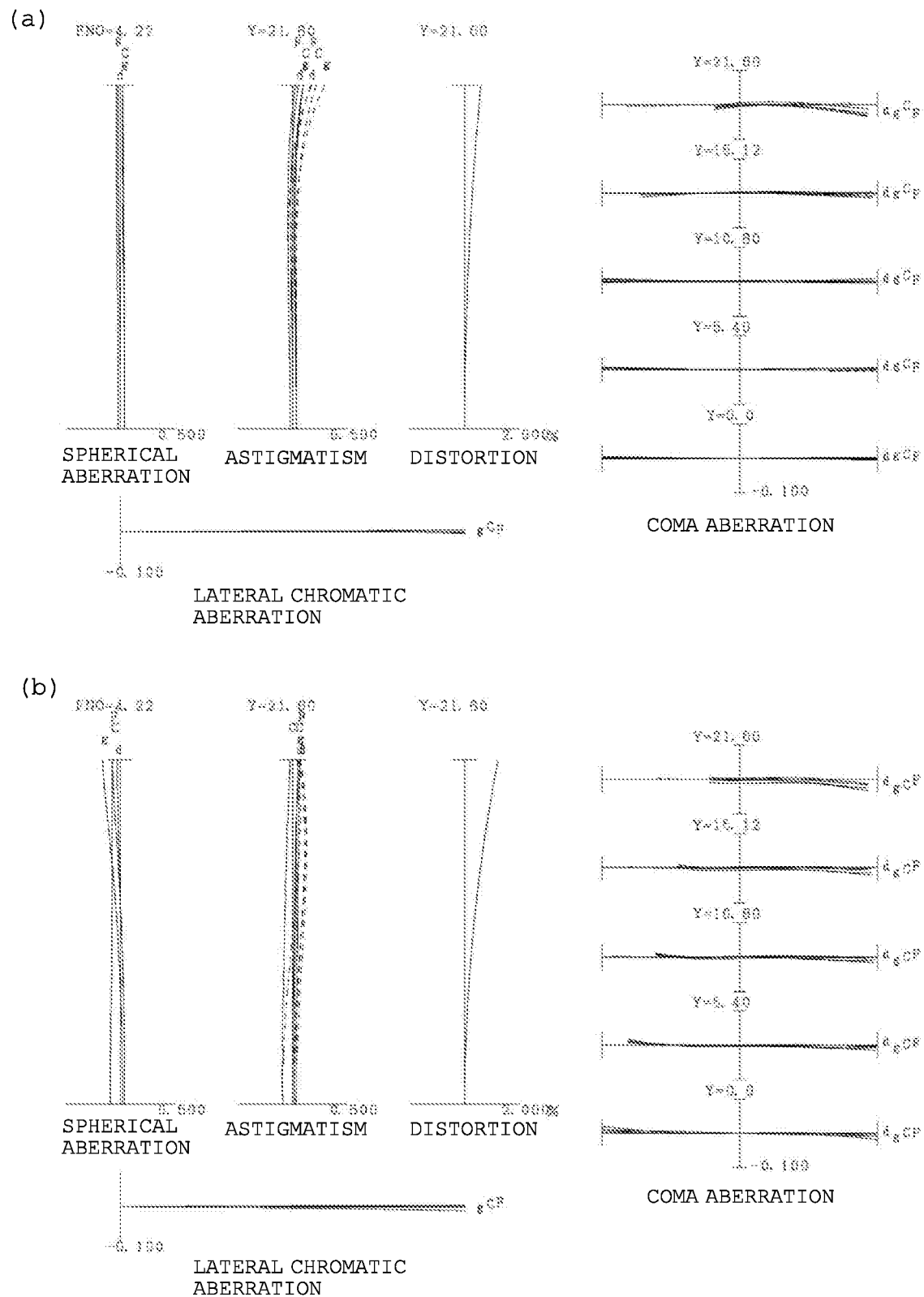

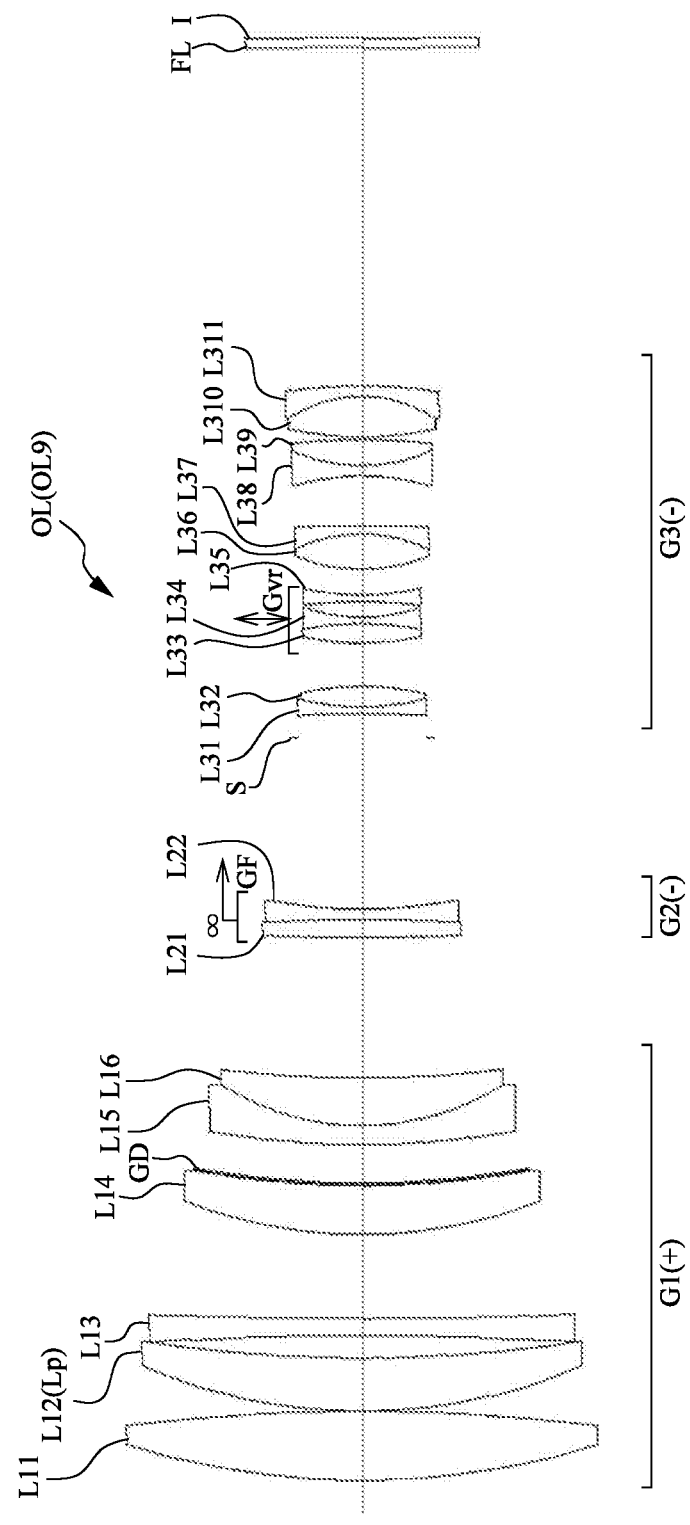
[FIG. 17]

[FIG. 18]
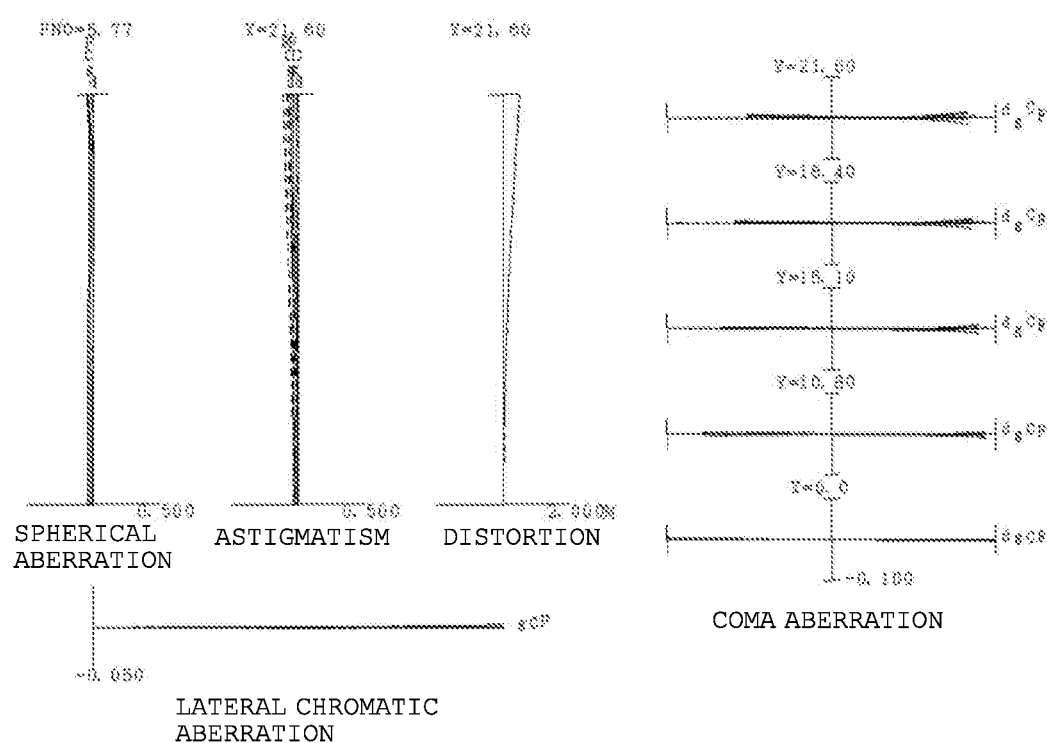

[FIG. 19]
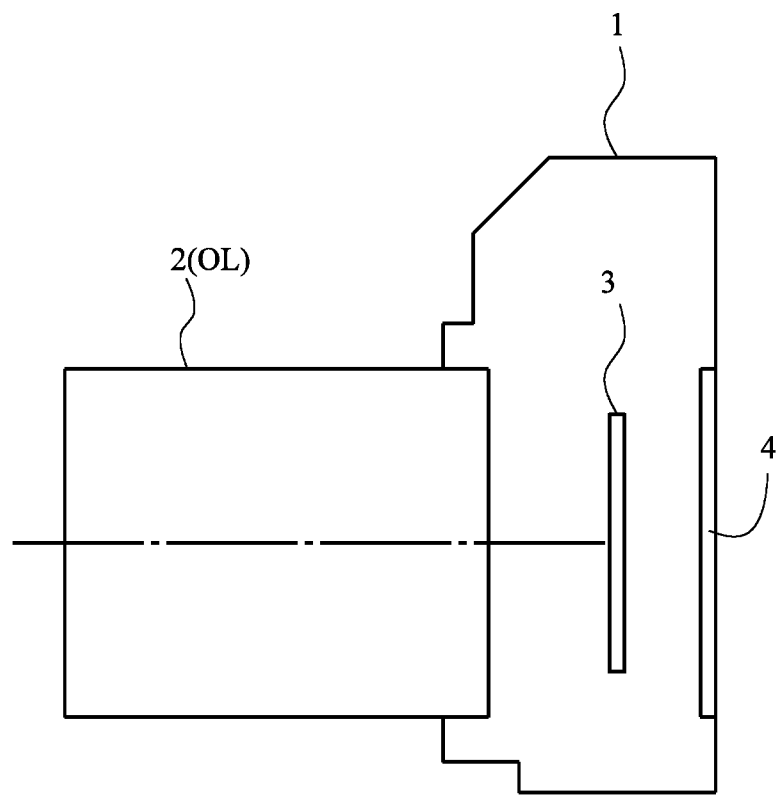

[FIG. 20]
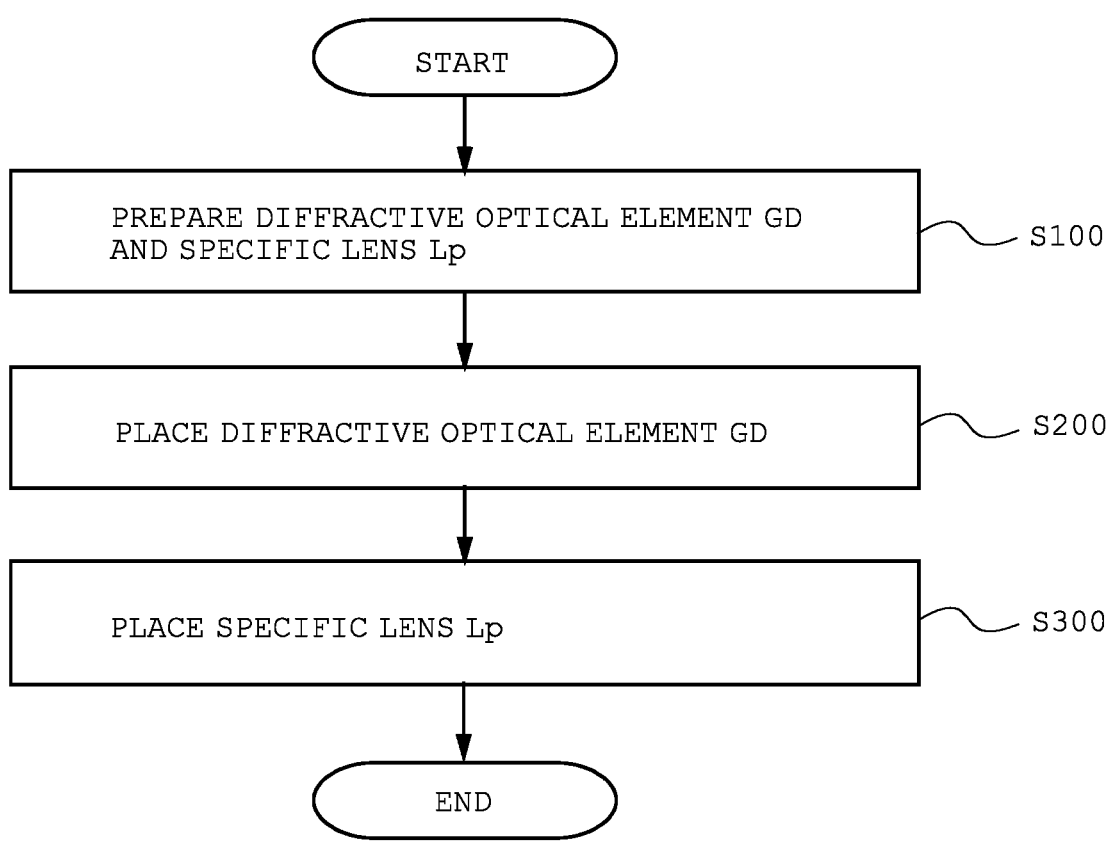

OPTICAL SYSTEM, OPTICAL APPARATUS, AND METHOD FOR MANUFACTURING OPTICAL SYSTEM

TECHNICAL FIELD

The present invention relates to an optical system, an optical apparatus, and a method for manufacturing the optical system.

BACKGROUND ART

There has been a proposed optical system downsized by using a diffractive optical element (see Patent Literature 1, for example). The optical system described in Patent Literature 1 is, however, required to have further improved optical performance.

CITATION LIST

Patent Literature

Patent Literature 1: Japanese Patent Laid-Open No. 2013-092575

SUMMARY OF INVENTION

An optical system according to a first aspect of the present invention includes a diffractive optical element and at least one lens made of crystalline glass.

A method for manufacturing an optical system according to the first aspect of the present invention includes disposing a diffractive optical element and disposing at least one lens made of crystalline glass.

BRIEF DESCRIPTION OF DRAWINGS

FIG. 1 is a cross-sectional view showing a lens configuration of an optical system according to a first embodiment upon focusing on infinity.

FIG. 2 shows a variety of aberrations of the optical system according to the first embodiment upon focusing on infinity.

FIG. 3 is a cross-sectional view showing a lens configuration of an optical system according to a second embodiment upon focusing on infinity.

FIG. 4 shows a variety of aberrations of the optical system according to the second embodiment upon focusing on infinity.

FIG. 5 is a cross-sectional view showing a lens configuration of an optical system according to a third embodiment upon focusing on infinity.

FIG. 6 shows a variety of aberrations of the optical system according to the third embodiment upon focusing on infinity.

FIG. 7 is a cross-sectional view showing a lens configuration of an optical system according to a fourth embodiment upon focusing on infinity.

FIG. 8 shows a variety of aberrations of the optical system according to the fourth embodiment upon focusing on infinity.

FIG. 9 is a cross-sectional view showing a lens configuration of an optical system according to a fifth embodiment upon focusing on infinity.

FIG. 10 shows a variety of aberrations of the optical system according to the fifth embodiment upon focusing on infinity.

FIG. 11 is a cross-sectional view showing a lens configuration of an optical system according to a sixth embodiment upon focusing on infinity.

FIG. 12 shows a variety of aberrations of the optical system according to the sixth embodiment upon focusing on infinity.

FIG. 13 is a cross-sectional view showing a lens configuration of an optical system according to a seventh embodiment upon focusing on infinity.

FIG. 14 shows a variety of aberrations of the optical system according to the seventh embodiment upon focusing on infinity.

FIG. 15 is a cross-sectional view showing a lens configuration of an optical system according to an eighth embodiment upon focusing on infinity.

FIG. 16 shows a variety of aberrations of the optical system according to the eighth embodiment upon focusing on infinity, (a) representing a wide-angle state and (b) representing a telescopic state.

FIG. 17 is a cross-sectional view showing a lens configuration of an optical system according to a ninth embodiment upon focusing on infinity.

FIG. 18 shows a variety of aberrations of the optical system according to the ninth embodiment upon focusing on infinity.

FIG. 19 is a cross-sectional view of a camera that incorporates the optical system.

FIG. 20 is a flowchart for describing a method for manufacturing the optical system.

DESCRIPTION OF EMBODIMENT

A preferable embodiment will be described below with reference to the drawings.

An optical system OL according to the present embodiment includes a diffractive optical element GD and at least one lens made of crystalline glass (hereinafter referred to as "specific lens Lp"), as shown in FIG. 1. The diffractive optical element GD and the specific lens Lp are disposed on the object side with respect to an aperture stop S. The lens used herein refers to a single lens or each lens that forms a cemented lens.

In the optical system OL according to the present embodiment, the specific lens Lp desirably satisfies Conditional Expression (1) shown below.

$$\theta gFp + 0.0017 \times vdp < 0.730 \quad (1)$$

In the expression,

θgFp: partial dispersion ratio of the medium of the specific lens Lp, and vdp: Abbe number of the medium of the specific lens Lp at the d line.

Let now ng, nd, nF, and nC be the refractive indices at the g, d, F, and C lines. The Abbe number vd at the d line is defined by the following Expression (a), and the partial dispersion ratio θgF is defined by the following Expression (b).

$$vd = (nd-1)/(nF-nC) \quad (a)$$

$$\theta gF = (ng-nF)/(nF-nC) \quad (b)$$

Conditional Expression (1) specifies the partial dispersion ratio of the glass material (medium) used to form the specific lens Lp and further specifies the range of dispersion. Satisfying Conditional Expression (1) allows satisfactory correction of the axial and lateral second-order chromatic aberrations. When the value of the left side of Conditional Expression (1) is greater than the upper limit, the axial second-order chromatic aberration is undesirably excessively corrected. To ensure the effect provided by Conditional Expression (1), it is desirable to set the upper limit in Conditional Expression (1) to 0.710, more desirably, 0.670, 0.660, or 0.650.

Further, in the optical system OL according to the present embodiment, the specific lens Lp desirably satisfies Conditional Expression (2) shown below.

$$ndp<1.48 \qquad (2)$$

In the expression, ndp: refractive index of the medium of the specific lens Lp at the d line.

Conditional Expression (2) specifies the range of the refractive index of the glass material (medium) used to form the specific lens Lp. Satisfying Conditional Expression (2) allows satisfactory correction of the curvature of field. When ndp is greater than the upper limit in Conditional Expression (2), it is undesirably difficult to correct the curvature of field. To ensure the effect provided by Conditional Expression (2), it is desirable to set the upper limit in Conditional Expression (2) to 1.47, more desirably, 1.46.

Further, in the optical system OL according to the present embodiment, the specific lens Lp desirably satisfies Conditional Expression (3) shown below.

$$vdp<97.0 \qquad (3)$$

In the expression, vdp: Abbe number of the medium of the specific lens Lp at the d line.

Conditional Expression (3) specifies the range of dispersion of the glass material (medium) used to form the specific lens Lp. Satisfying Conditional Expression (3) allows satisfactory correction of the axial chromatic aberration. When vdp is greater than the upper limit in Conditional Expression (3), it is undesirably difficult to correct the axial chromatic aberration. To ensure the effect provided by Conditional Expression (3), it is desirable to set the upper limit in Conditional Expression (3) to 96.0, more desirably, 90.0, 80.0, 75.0, or 70.0.

Further, in the optical system OL according to the present embodiment, the diffractive optical element GD desirably satisfies Conditional Expression (4) shown below.

$$0.40<TLpf/TL<1.00 \qquad (4)$$

In the expression,

TL: overall length of the optical system OL upon focusing on infinity, and

TLpf: on-optical axis distance from the image plane to the diffractive optical surface of the diffractive optical element GD upon focusing on infinity.

Conditional Expression (4) specifies the ratio of the on-axis distance from the image plane to the diffractive optical surface of the diffractive optical element to the overall length of the optical system OL. Satisfying Conditional Expression (4) allows satisfactory correction of the axial second-order chromatic aberration. When TLpf/TL is greater than the upper limit in Conditional Expression (4), it is undesirably difficult to correct the axial second-order chromatic aberration. To ensure the effect provided by Conditional Expression (4), it is desirable to set the upper limit in Conditional Expression (4) to 0.95, more desirably, 0.92. When TLpf/TL is smaller than the lower limit in Conditional Expression (4), it is undesirably difficult to correct the lateral second-order chromatic aberration. To ensure the effect provided by Conditional Expression (4), it is desirable to set the lower limit in Conditional Expression (4) to 0.50, more desirably, 0.70.

Further, the optical system OL according to the present embodiment desirably satisfies Conditional Expression (5) shown below.

$$0.50°<\omega<6.00° \qquad (5)$$

In the expression,

ω: half angle of view of the optical system OL upon focusing on infinity.

Conditional Expression (5) is a condition that specifies an optimum value of the half angle of view in the optical system OL. Satisfying Conditional Expression (5) allows satisfactory correction of coma aberration, distortion, curvature of field, and other aberrations. To ensure the effect provided by Conditional Expression (5), it is desirable to set the upper limit in Conditional Expression (5) to 5.80°, more desirably, 5.60°. To ensure the effect provided by Conditional Expression (5), it is desirable to set the lower limit in Conditional Expression (5) to 0.60°, more desirably, 0.70°.

The optical system OL according to the present embodiment desirably includes at least one specific lens Lp on the object side with respect to the diffractive optical element GD. The configuration described above allows satisfactory correction of the spherical aberrations and the axial second-order chromatic aberration.

The optical system OL according to the present embodiment desirably further includes at least one negative lens on the object side with respect to the diffractive optical element GD. The configuration described above allows simultaneous satisfactory correction of the spherical aberrations and the axial second-order chromatic aberration.

Further, the optical system OL according to the present embodiment desirably satisfies Conditional Expression (6) shown below.

$$0.20<fp/f<1.50 \qquad (6)$$

In the expression, f: focal length of the optical system OL upon focusing on infinity, and fp: focal length of the specific lens Lp (focal length of the specific lens Lp having the shortest focal length in a case where a plurality of specific lenses Lp are provided).

Conditional Expression (6) specifies the ratio of the focal length of the specific lens Lp to the focal length of the optical system OL upon focusing on infinity. Satisfying Conditional Expression (6) allows simultaneous satisfactory correction of the spherical aberrations and the axial second-order chromatic aberration. When fp/f is greater than the upper limit in Conditional Expression (6), it is undesirably difficult to correct the lateral second-order chromatic aberration. To ensure the effect provided by Conditional Expression (6), it is desirable to set the upper limit in Conditional Expression (6) to 1.10, more desirably, 1.05. When fp/f is smaller than the lower limit in Conditional Expression (6), it is undesirably difficult to correct the axial second-order chromatic aberration. To ensure the effect provided by Conditional Expression (6), it is desirable to set the lower limit in Conditional Expression (6) to 0.30, more desirably, 0.35.

Further, the optical system OL according to the present embodiment desirably satisfies Conditional Expression (7) shown below.

$$0.00<f/fpf<0.10 \qquad (7)$$

In the expression, f: focal length of the optical system OL upon focusing on infinity, and fpf: focal length of the diffractive optical surface of the diffractive optical element GD.

Conditional Expression (7) specifies the ratio of the focal length of the diffractive optical element GD to the focal length of the optical system OL. Satisfying Conditional Expression (7) allows satisfactory correction of the axial second-order chromatic aberration. When f/fpf is greater than the upper limit in Conditional Expression (7), it is undesirably difficult to correct the axial second-order chromatic aberration. To ensure the effect provided by Conditional Expression (7), it is desirable to set the upper limit in Conditional Expression (7) to 0.09, more desirably, 0.08, still more desirably, 0.06. When f/fpf is smaller than the lower limit in Conditional Expression (7), it is undesirably difficult to correct the lateral second-order chromatic aberration. To ensure the effect provided by Conditional Expression (7), it is desirable to set the lower limit in Conditional Expression (7) to 0.01, more desirably, 0.02.

Further, the optical system OL according to the present embodiment desirably satisfies Conditional Expression (8) shown below.

$$0.30 < TL/f < 1.50 \tag{8}$$

In the expression,

TL: overall length of the optical system OL upon focusing on infinity, and f: focal length of the optical system OL upon focusing on infinity.

Conditional Expression (8) specifies the ratio of the focal length of the optical system OL to the overall length of the optical system OL. Satisfying Conditional Expression (8) allows satisfactory correction of the axial second-order chromatic aberration. When TL/f is greater than the upper limit in Conditional Expression (8), it is undesirably difficult to correct the axial second-order chromatic aberration. To ensure the effect provided by Conditional Expression (8), it is desirable to set the upper limit in Conditional Expression (8) to 1.30, more desirably, 1.20, still more desirably, 1.10. When TL/f is smaller than the lower limit in Conditional Expression (8), it is undesirably difficult to correct the lateral second-order chromatic aberration. To ensure the effect provided by Conditional Expression (8), it is desirable to set the lower limit in Conditional Expression (8) to 0.40, more desirably, 0.45.

The optical system OL according to the present embodiment desirably further includes at least two specific lenses Lp on the object side with respect to the diffractive optical element GD. The configuration described above allows satisfactory correction of the spherical aberrations and the axial second-order chromatic aberration.

The optical system OL according to the present embodiment desirably includes a first lens group G1 having positive refractive power, a second lens group G2 having negative refractive power, and a third lens group G3 sequentially arranged from the object side, and the second lens group G2 is desirably a focusing group Gf, which is moved along the optical axis of the optical system OL for focusing. The configuration described above allows the focusing group Gf to be quickly driven when an actuator performs automatic focusing and spherical aberrations and the curvature of field to be satisfactorily corrected when focusing at a close distance.

In the optical system OL according to the present embodiment, the specific lens Lp is desirably disposed on the object side with respect to the focusing group Gf. The configuration described above allows satisfactory correction of the axial second-order chromatic aberration.

In the optical system OL according to the present embodiment, the focusing group Gf desirably moves toward the image side when changing focus from infinity to an object at a close distance. The configuration described above allows satisfactory correction of the spherical aberrations and the axial chromatic aberration when focusing at a close distance.

In the optical system OL according to the present embodiment, the focusing group Gf desirably includes at least one positive lens component. The configuration described above allows satisfactory correction of the axial chromatic aberration when focusing at a close distance.

In the optical system OL according to the present embodiment, the third lens group G3 desirably includes a vibration-proof lens Gvr, which moves in such a way that the vibration-proof lens Gvr has a displacement component in a direction perpendicular to the optical axis. The configuration described above allows correction of a shift of the optical axis in a case where the optical system vibrates due, for example, to a shake of a hand that holds the optical system.

Further, the optical system OL according to the present embodiment desirably satisfies Conditional Expression (9) shown below.

$$0.15 < (-f2)/f < 0.70 \tag{9}$$

In the expression, f: focal length of the optical system OL upon focusing on infinity, and f2: focal length of the second lens group G2.

Conditional Expression (9) specifies the ratio of the focal length of the second lens group G2 to the focal length of the optical system OL. Satisfying Conditional Expression (9) allows satisfactory correction of the lateral second-order chromatic aberration. When (−f2)/f is greater than the upper limit in Conditional Expression (9), the weight of the focusing group Gf, which is the second lens group G2, undesirably increases, and using a low-refractive-index glass material for weight reduction undesirably makes it difficult to correct the coma aberration. To ensure the effect provided by Conditional Expression (9), it is desirable to set the upper limit in Conditional Expression (9) to 0.60, more desirably, 0.50. When (−f2)/f is smaller than the lower limit in Conditional Expression (9), it is undesirably difficult to correct the lateral second-order chromatic aberration. To ensure the effect provided by Conditional Expression (9), it is desirable to set the lower limit in Conditional Expression (9) to 0.20, more desirably, 0.25.

Further, the optical system OL according to the present embodiment desirably satisfies Conditional Expression (10) shown below.

$$0.20 < f1/f < 0.55 \tag{10}$$

In the expression, f: focal length of the optical system OL upon focusing on infinity, and f1: focal length of the first lens group G1.

Conditional Expression (10) specifies the ratio of the focal length of the first lens group G1 to the overall length of the optical system OL. Satisfying Conditional Expression (10) allows satisfactory correction of the spherical aberrations. When f1/f is greater than the upper limit in Conditional Expression (10), the size of the optical system OL increases, and reduction in the number of lenses for size reduction undesirably makes it difficult to correct spherical aberrations. To ensure the effect provided by Conditional Expression (10), it is desirable to set the upper limit in Conditional Expression (10) to 0.50, more desirably, 0.45. When f1/f is smaller than the lower limit in Conditional Expression (10), it is undesirably difficult to correct the coma aberration. To ensure the effect provided by Conditional Expression (10), it is desirable to set the lower limit in Conditional Expression (10) to 0.25, more desirably, 0.30.

Further, the optical system OL according to the present embodiment desirably satisfies Conditional Expression (11) shown below.

$$0.00<fp/f1<4.00 \quad (11)$$

In the expression, fp: focal length of the specific lens Lp (focal length of the specific lens Lp having the shortest focal length in a case where a plurality of specific lenses Lp are provided), and f1: focal length of the first lens group G1.

Conditional Expression (11) specifies the ratio of the focal length of the specific lens Lp to the focal length of the first lens group G1. Satisfying Conditional Expression (11) allows satisfactory correction of the axial second-order chromatic aberration. When fp/f1 is greater than the upper limit in Conditional Expression (11), it is undesirably difficult to correct the axial second-order chromatic aberration. To ensure the effect provided by Conditional Expression (11), it is desirable to set the upper limit in Conditional Expression (11) to 3.50, more desirably, 3.00. When fp/f1 is smaller than the lower limit in Conditional Expression (11), it is undesirably difficult to correct the lateral second-order chromatic aberration. To ensure the effect provided by Conditional Expression (11), it is desirable to set the lower limit in Conditional Expression (11) to 0.50, more desirably, 1.00.

In the optical system OL according to the present embodiment, the specific lens Lp is desirably a crystal material primarily made of silicon dioxide ($SiO_2$) or calcium fluoride ($CaF_2$). As a result, the effect of correcting second-order chromatic aberrations can be achieved with variation in axial chromatic aberrations suppressed to a small value in mass production.

In the optical system OL according to the present embodiment, the crystalline glass refers to crystalline glass having a wide transmission wavelength range, a small refractive index, and low dispersion. The optical lens uses quartz or fluorite as a representative crystal material of the crystalline glass.

A method for manufacturing the optical system OL according to the present embodiment will be described below with reference to FIG. 20. The diffractive optical element GD and the at least one specific lens Lp, which is a lens made of crystalline glass, are first prepared (step S100). The diffractive optical element GD is placed (step S200), and the specific lens Lp is placed (step S300).

The conditions and configurations described above each provide the effect described above, and all the conditions and configurations are not necessarily satisfied. An optical system that satisfies any of the conditions and configurations or a combination of any of the conditions and configurations can provide the effects described above.

A camera that is an optical apparatus including the optical system OL according to the present embodiment will next be described with reference to FIG. 19. The camera 1 is what is called a mirrorless camera that allows lens exchange and includes the optical system OL according to the present embodiment as an imaging lens 2. In the present camera 1, light from an object (subject) that is not shown is collected by the imaging lens 2 to form a subject image on the imaging surface of an imager 3 via an optical low pass filter (OLPF) that is not shown. A photoelectric converter provided in the imager 3 photoelectrically converts the subject image into an electrical form. An image of the subject is thus produced. The image is displayed on an electronic view finder (EVF) 4 provided on the camera 1. A photographer can thus observe the subject on the EVF 4.

When the photographer presses a release button that is not shown, the image photoelectrically converted by the imager 3 is stored in a memory that is not shown. The photographer can thus capture an image of the subject via the present camera 1. The present embodiment has been described with reference to a mirrorless camera. The same effects as those provided by the camera 1 described above can be provided even in a case where the optical system OL according to the present embodiment is incorporated in a single lens reflex camera that includes a quick-return mirror in the camera body and allows the photographer to observe a subject through a finder optical system.

The contents described below are employable as appropriate to the extent that the optical performance is not compromised.

In the present embodiment, the optical system OL having the three-group configuration has been shown, and the configuration conditions and others described above are also applicable to a four-group configuration, a five-group configuration, and other group configurations. Further, the optical system OL may instead have a configuration in which a lens or a lens group closest to the object side is added or a configuration in which a lens or a lens group closest to the image side is added. Specifically, it is conceivable to employ a configuration in which a lens group closest to the image side is so added that the position thereof is fixed with respect to the image plane when changing magnification or when focusing. The lens group represents a portion including at least one lens separate from another by an air space that changes when changing magnification or when focusing. The lens component is a cemented lens formed of a single lens or a plurality of lenses cemented to each other.

The focusing group may be a single lens group, a plurality of lens groups, or a partial lens group moved along the optical axis to focus on an object at a close distance after focusing on an object at infinity. In this case, the focusing group can also be used to perform autofocusing and is suitably driven with a motor for autofocusing (such as ultrasonic motor). In particular, it is preferable that the focusing group is at least part of the second lens group G2 and positions of the other lenses of the second lens group G2 are fixed with respect to the image plane at the time of focusing. The focusing group is preferably formed of a single lens or one lens component in consideration of the load acting on the motor.

The vibration-proof lens may be so configured that a lens group or a partial lens group is so moved as to have a displacement component in a direction perpendicular to the optical axis or rotated (swung) in the in-plane direction containing the optical axis to correct an image blur caused by a shake of a hand that holds the optical system. In particular, the vibration-proof lens is preferably at least part of the third lens group G3.

A lens surface may be so formed as to be a spherical surface, a flat surface, or an aspheric surface. In the case where a lens surface is a spherical or flat surface, the lens is readily processed, assembled, and adjusted, whereby degradation in the optical performance due to errors in the lens processing, assembly, and adjustment is preferably avoided.

Further, even when the image plane is shifted, the amount of degradation in drawing performance is preferably small. In the case where the lens surface is an aspheric surface, the aspheric surface may be any of a ground aspheric surface, a glass molded aspheric surface that is a glass surface so molded in a die as to have an aspheric shape, and a composite aspheric surface that is a glass surface on which aspherically shaped resin is formed. The lens surface may instead be a diffractive surface, or any of the lenses may be a distributed index lens (GRIN lens) or a plastic lens.

The aperture stop S is preferably disposed on the image side with respect to the focusing group. Instead, no member as the aperture stop may be provided, and the frame of a lens may serve as the aperture stop.

Further, each lens surface may be provided with an antireflection film having high transmittance over a wide wavelength range to achieve good optical performance that reduces flare and ghost and achieves high contrast.

The configuration described above can provide an optical system having good imaging performance, an optical apparatus, and a method for manufacturing the optical system.

EXAMPLES

Examples will be described below with reference to the drawings. FIGS. 1, 3, 5, 7, 9, 11, 13, 15, and 17 are cross-sectional views showing the configurations of the optical systems OL (OL1 to OL9) according to the examples and further showing the distribution of the refractive index. In a lower portion of the cross-sectional view of FIG. 15, which shows the configuration of the optical system OL8 according to the eighth example, the directions in which the lens groups G1 to G6 move along the optical axis when changing magnification from a wide-angle end state (W) to a telescopic end state (T) are shown by arrows.

In each of the examples, a phase shape φ of the diffractive optical surface is expressed by the following Expression (c).

$$\varphi(h,n)=(2\pi/(n\times\lambda 0))\times(C2h^2+C4h^4) \quad (c)$$

In the expression,
h: height in the direction perpendicular to the optical axis,
n: degree of diffracted light,
λ0: design wavelength, and
Ci: phase coefficient (i=2, 4).

Refractive power φD of the diffractive optical surface expressed by Expression (c) for an arbitrary wavelength λ and an arbitrary diffraction degree m is expressed by the following Expression (d) by using the lowest-degree phase coefficient C2.

$$\varphi(\lambda,n)=-2\times C2\times n\times\lambda/\lambda 0 \quad (d)$$

In the table in each of the examples, the diffractive optical surface is affixed with a mark * on the right of the surface number.

In the second example, an aspheric surface is expressed by the following Expression (e).

In the expression,
y represents a height in the direction perpendicular to the optical axis,
S(y) represents the distance (sag amount) along the optical axis at the height y from a plane tangential to the vertex of the aspheric surface to the aspheric surface,
r represents the radius of curvature of a reference spherical surface (paraxial radius of curvature),
K represents the conical constant, and
An represents an n-th-order aspheric coefficient.

$$S(y)=(y^2/r)/\{1+(1-Ky^2/r^2)^{1/2}\}+A4\times y^4+A6\times y^6 \quad (e)$$

In the second example, the second-order aspheric coefficient A2 is zero. In the table in the second example, an aspheric surface is affixed with a mark ** on the right of the surface number.

In each of the examples, "E-n" represents "×10$^{-n}$."

First Example

FIG. 1 shows a configuration of an optical system OL1 according to a first example. The optical system OL1 includes a first lens group G1 having positive refractive power, a second lens group G2 having negative refractive power, the aperture stop S, and a third lens group G3 having negative refractive power sequentially arranged from the object side, and when changing focus from infinity to an object at a close distance, the second lens group G2 is moved as the focusing group Gf along the optical axis toward the image side for focusing.

The first lens group G1 includes a biconvex positive lens L11, a cemented positive lens formed of a biconvex positive lens L12 and a biconcave negative lens L13 cemented to each other, a positive meniscus lens L14 having a convex surface facing the object side and an image-side lens surface on which an intimate-contact-multilayer diffractive optical element GD made of two different types of material is formed, and a cemented positive lens formed of a negative meniscus lens L15 having a convex surface facing the object side and a positive meniscus lens L16 having a convex surface facing the object side with the lenses L15 and L16 cemented to each other, with the lenses L11 to L16 sequentially arranged from the object side. The second lens group G2 is formed of a cemented negative lens formed of a biconvex positive lens L21 and a biconcave negative lens L22 sequentially arranged from the object side and cemented to each other. The third lens group G3 is formed of a cemented positive lens formed of a negative meniscus lens L31 having a convex surface facing the object side and a biconvex positive lens L32 with the lenses L31 and L32 cemented to each other, a cemented negative lens formed of a biconvex positive lens L33 and a biconcave negative lens L34 cemented to each other, a biconcave negative lens L35, a biconvex positive lens L36, and a positive meniscus lens L37 having a convex surface facing the object side with the lenses L31 to L37 sequentially arranged from the object side. In the optical system OL1, the specific lens Lp is the biconvex positive lens L11.

The optical system OL1 according to the first example is so configured that the cemented negative lens formed of the biconvex positive lens L33 and the biconcave negative lens L34 cemented to each other and the biconcave negative lens L35 in the third lens group G3 form a vibration-proof lens Gvr and the vibration-proof lens Gvr is so moved as to have a displacement component in a direction perpendicular to the optical axis for correction of a change in the image position resulting, for example, from vibration of the optical system OL1.

Table 1 below shows the values of a variety of parameters of the optical system OL1. In Table 1, the following parameters shown as a variety of overall parameters are defined as follows: f represents the focal length of the overall optical system; FNO represents the F number; ω represents a half angle of view [°]; and TL represents the overall length of the optical system, and the values in the variety of overall parameters are those upon focusing on infinity. The overall length TL represents the distance along the optical axis from the lens surface closest to the object side (first surface) to an image plane I. In the lens data, a first field m shows the sequence of the lens surfaces (surface numbers) counted from the object side along the direction in which the rays travel. A second field r shows the radius of curvature of each lens surface. A third field d shows the on-axis distance (inter-surface distance) from each optical surface to the following optical surface. A fourth field νd and a fifth field nd show the Abbe number and the refractive index at the d line (λ=587.6 nm). A sixth field θgF shows the partial dispersion ratio. A radius of curvature of 0.0000 represents a flat surface, and the refractive index of air, which is 1.00000, is omitted. The lens group focal length shows the number and the focal length of the first surface of each of the first to third lens groups G1 to G3.

The unit of each of the focal length f, the radius of curvature r, the inter-surface distance d, and other lengths shown in all the variety of parameters below is typically "mm," but not limited to this, because an optical system provides the same optical performance even when the optical system is proportionally enlarged or reduced. Further, the description of the reference characters and the description of the parameter tables hold true for those in the following examples.

TABLE 1

First example
[Overall Parameters]
f = 294.09654
FNO = 4.08255
ω = 4.15846
TL = 192.75596

[Lens data]

| m | r | d | νd | nd | θgF |
|---|---|---|---|---|---|
| Object plane | ∞ | D0 | | | |
| 1 | 179.2200 | 6.2902 | 67.81 | 1.458440 | 0.5277 |
| 2 | −570.1507 | 0.1000 | | | |
| 3 | 81.1870 | 9.7743 | 82.57 | 1.497820 | 0.5386 |
| 4 | 1361.3167 | 1.5000 | 41.51 | 1.575010 | 0.5765 |
| 5 | 227.9138 | 2.0000 | | | |
| 6 | 69.3917 | 5.0000 | 63.88 | 1.516800 | 0.5360 |
| 7 | 91.4300 | 0.2000 | 33.36 | 1.527800 | 0.6291 |
| 8* | 91.4300 | 0.3000 | 49.98 | 1.557147 | 0.5688 |
| 9 | 91.4300 | 23.8212 | | | |
| 10 | 51.3435 | 1.5000 | 35.25 | 1.910822 | 0.5822 |
| 11 | 31.5258 | 7.7472 | 70.32 | 1.487490 | 0.5291 |
| 12 | 122.7186 | D1 | | | |
| 13 | 217.1933 | 2.5000 | 36.40 | 1.620040 | 0.5878 |
| 14 | −143.3666 | 1.2000 | 55.52 | 1.696800 | 0.5430 |
| 15 | 49.3948 | D2 | | | |
| 16 | 0.0000 | 2.8100 | | | Aperture stop |
| 17 | 994.4024 | 1.1000 | 35.25 | 1.910822 | 0.5822 |
| 18 | 39.6934 | 2.9869 | 41.51 | 1.575010 | 0.5765 |
| 19 | −65.4310 | 1.9000 | | | |
| 20 | 85.9716 | 2.3300 | 28.38 | 1.728250 | 0.6069 |
| 21 | −62.3367 | 0.8500 | 54.61 | 1.729160 | 0.5443 |
| 22 | 35.9820 | 2.3300 | | | |
| 23 | −117.6448 | 0.8000 | 54.61 | 1.729160 | 0.5443 |
| 24 | 98.1231 | 2.1300 | | | |
| 25 | 70.7263 | 1.9452 | 47.35 | 1.788000 | 0.5559 |
| 26 | −652.9898 | 24.7984 | | | |
| 27 | 47.5181 | 5.0000 | 70.32 | 1.487490 | 0.5291 |
| 28 | 102.0337 | BF | | | |
| Image plane | ∞ | | | | |

TABLE 1-continued

First example
[Overall Parameters]
f = 294.09654
FNO = 4.08255
ω = 4.15846
TL = 192.75596

[Focal length of lens groups]

| Lens group | First surface | Focal length |
|---|---|---|
| First lens group | 1 | 102.4 |
| Second lens group | 13 | −85.5 |
| Third lens group | 16 | −300.6 |

In the optical system OL1, the eighth surface is the diffractive optical surface. Table 2 below shows data on the diffractive optical surface, that is, the values of the design wavelength λ0, the degree n, and the phase coefficients C2 and C4.

TABLE 2

[Data on diffractive optical surface]

| m | λ0 | n | C2 | C4 |
|---|---|---|---|---|
| 8 | 587.6 | 1.0 | −4.07752E−05 | −4.17277E−09 |

In the optical system OL1, an on-axis air space D0 between the object and the first lens group G1, an on-axis air space D1 between the first lens group G1 and the second lens group G2, an on-axis air space D2 between the second lens group G2 and the third lens group G3, and the back focus BF change when focusing. Table 3 below shows variable distances in the state of focusing at infinity and the state of focusing at a close distance. D0 represents the distance from the surface (first surface) closest to the object side in the optical system OL1 to the object, f represents the focal length of the optical system OL1, β represents the magnification of the optical system OL1, and the back focal length BF represents the distance (air equivalent length) from the optical surface (twenty eighth surface) closest to the image plane side to the image plane I (the description also holds true for the following examples).

TABLE 3

[Variable distance data]

| State of focusing | Infinity | Close distance |
|---|---|---|
| f | 294.09654 | — |
| β | — | −0.24484 |
| D0 | ∞ | 1207.2562 |
| D1 | 13.53953 | 26.91791 |
| D2 | 24.88061 | 11.50223 |
| BF | 43.42236 | 43.66559 |

Table 4 below shows values compliant to the conditional expressions in the optical system OL1. The specific lens Lp in Conditional Expressions (6) and (11) is the biconvex positive lens L11.

TABLE 4

[Values compliant to conditional expressions]

(1) θgFp + 0.0017 × vdp = 0.64
(2) ndp = 1.46
(3) vdp = 67.8
(4) TLpf/TL = 0.871
(5) ω = 4.158°
(6) fp/f = 1.01
(7) f/fpf = 0.024
(8) TL/f = 0.66
(9) (−f2)/f = 0.29
(10) f1/f = 0.35
(11) fp/f1 = 2.91

As described above, the optical system OL1 satisfies Conditional Expressions (1) to (11) described above.

FIG. 2 shows a spherical aberration diagram, an astigmatism diagram, a distortion diagram, a lateral chromatic aberration diagram, and a coma aberration diagram of the optical system OL1 upon focusing on infinity. In each of the aberrations diagrams, FNO represents the F number, and Y represents the image height. The spherical aberration diagram shows the value of the F number corresponding to the maximum aperture, the astigmatism diagram and the distortion diagram show a maximum value of the image height, and the coma aberration diagram shows each image height. Reference character d represents the d line (λ=587.6 nm). Reference character g represents the g line (λ=435.8 nm). Reference character F represents the F line (λ=486.1 nm). Reference character C represents the C line (λ=656.3 nm). In the astigmatism diagram, the solid line represents the sagittal image plane, and the broken line represents the meridional image plane. Further, also in the aberration diagrams in the following examples, the same reference characters as those in the present example are used. The aberration diagrams show that the optical system OL1 allows satisfactory correction of the variety of aberrations and provides excellent imaging performance.

Second Example

FIG. 3 shows a configuration of an optical system OL2 according to a second example. The optical system OL2 includes a first lens group G1 having positive refractive power, a second lens group G2 having negative refractive power, the aperture stop S, and a third lens group G3 having negative refractive power sequentially arranged from the object side, and when changing focus from infinity to an object at a close distance, the second lens group G2 is moved as the focusing group Gf along the optical axis toward the image side for focusing.

The first lens group G1 includes a biconvex positive lens L11, a cemented positive lens formed of a planoconvex positive lens L12 having a convex surface facing the object side and an aspheric negative lens L13 having a planoconvex shape having a flat surface facing the object side and an aspheric surface facing the image side with the lenses L12 and L13 cemented to each other, and a diffractive optical surface in which an intimate-contact-multilayer diffractive optical element GD made of two different types of material is formed in a bonded surface between a negative meniscus lens L14 having a convex surface facing the object side and a positive meniscus lens L15 having a convex surface facing the object side sequentially arranged from the object side. The second lens group G2 is formed of a cemented negative lens formed of a biconvex positive lens L21 and a biconcave negative lens L22 sequentially arranged from the object side and cemented to each other. The third lens group G3 is formed of a cemented negative lens formed of a negative meniscus lens L31 having a convex surface facing the object side and a positive meniscus lens L32 having a convex surface facing the object side with the lenses L31 and L32 cemented to each other, a cemented negative lens formed of a positive meniscus lens L33 having a convex surface facing the object side and a biconcave negative lens L34 with the lenses L33 and L34 cemented to each other, a negative meniscus lens L35 having a convex surface facing the object side, a biconvex positive lens L36, a cemented positive lens formed of a biconvex positive lens L37 and a biconcave negative lens L38 cemented to each other, and a cemented negative lens formed of a biconcave negative lens L39 and a biconvex positive lens L310 cemented to each other with the lenses L31 to L310 sequentially arranged from the object side. In the optical system OL2, the specific lens Lp is the biconvex positive lens L11.

The optical system OL2 according to the second example is so configured that the cemented negative lens formed of the positive meniscus lens L33 and the biconcave negative lens L34 cemented to each other and the negative meniscus lens L35 in the third lens group G3 form a vibration-proof lens Gvr and the vibration-proof lens Gvr is so moved as to have a displacement component in a direction perpendicular to the optical axis for correction of a change in the image position resulting, for example, from vibration of the optical system OL2.

Table 5 below shows the values of a variety of parameters of the optical system OL2.

TABLE 5

Second example
[Overall Parameters]
f = 391.70138
FNO = 4.08000
ω = 3.12484
TL = 259.31861

[Lens data]

| m | r | d | vd | nd | θgF |
|---|---|---|---|---|---|
| Object plane | ∞ | D0 | | | |
| 1 | 132.1045 | 15.0000 | 67.81 | 1.458440 | 0.5277 |
| 2 | −3997.9810 | 0.1000 | | | |
| 3 | 80.5634 | 20.0000 | 82.57 | 1.497820 | 0.5386 |
| 4 | 0.0000 | 5.0000 | 44.46 | 1.612660 | 0.5640 |
| 5** | 217.1244 | 22.2724 | | | |
| 6 | 79.6948 | 2.6000 | 40.66 | 1.883000 | 0.5668 |

TABLE 5-continued

Second example
[Overall Parameters]
f = 391.70138
FNO = 4.08000
ω = 3.12484
TL = 259.31861

| | | | | | | |
|---|---|---|---|---|---|---|
| 7 | 40.7985 | 0.1000 | 40.66 | 1.883000 | 0.5668 | |
| 8* | 40.7985 | 0.1000 | 70.32 | 1.487490 | 0.5291 | |
| 9 | 40.7985 | 12.9000 | 70.32 | 1.487490 | 0.5291 | |
| 10 | 218.1060 | D1 | | | | |
| 11 | 165.1266 | 5.0000 | 33.72 | 1.647690 | 0.5930 | |
| 12 | −353.3925 | 2.0000 | 50.27 | 1.719990 | 0.5527 | |
| 13 | 72.3838 | D2 | | | | |
| 14 | 0.0000 | 4.6833 | | | | Aperture stop |
| 15 | 82.0212 | 3.0000 | 46.59 | 1.816000 | 0.5567 | |
| 16 | 30.9460 | 4.5000 | 58.82 | 1.518230 | 0.5449 | |
| 17 | 107.8431 | 5.0000 | | | | |
| 18 | −136.2658 | 3.0000 | 36.40 | 1.620040 | 0.5878 | |
| 19 | −42.2848 | 2.0000 | 82.57 | 1.497820 | 0.5386 | |
| 20 | 55.7038 | 1.5000 | | | | |
| 21 | 4913.5124 | 1.2000 | 67.90 | 1.593190 | 0.5440 | |
| 22 | 64.6092 | 5.0000 | | | | |
| 23 | 49.0265 | 8.0000 | 70.32 | 1.487490 | 0.5291 | |
| 24 | −1148.2154 | 14.1234 | | | | |
| 25 | 66.5966 | 10.0000 | 29.35 | 1.716230 | 0.5988 | |
| 26 | −36.9570 | 2.0000 | 46.59 | 1.816000 | 0.5567 | |
| 27 | 590.1475 | 1.5997 | | | | |
| 28 | −132.0620 | 2.0000 | 22.74 | 1.808090 | 0.6287 | |
| 29 | 61.4838 | 8.0000 | 40.98 | 1.581440 | 0.5763 | |
| 30 | −72.5175 | BF | | | | |
| Image plane | ∞ | | | | | |

[Focal length of lens groups]

| Lens group | First surface | Focal length |
|---|---|---|
| First lens group | 1 | 139.1 |
| Second lens group | 9 | −164.9 |
| Third lens group | 13 | −220.1 |

In the optical system OL2, the seventh surface is the diffractive optical surface. Table 6 below shows data on the diffractive optical surface. Further, in the optical system OL2, the fifth surface is so formed as to have an aspheric shape. Table 6 below further shows data on the aspheric surface, that is, the values of the conical constant K and the aspheric coefficients A4 to A8.

TABLE 6

[Data on diffractive optical surface]

| m | λ0 | n | C2 | C4 |
|---|---|---|---|---|
| 8 | 486.1 | 1.0 | −4.34022E−05 | −8.23574E−09 |

[Data on aspheric surface]

| m | K | A4 | A6 |
|---|---|---|---|
| 5 | 1.0000 | 5.12132E−08 | −2.38098E−12 |

In the optical system OL2, the on-axis air space D0 between the object and the first lens group G1, the on-axis air space D1 between the first lens group G1 and the second lens group G2, the on-axis air space D2 between the second lens group G2 and the third lens group G3, and the back focal length BF change when focusing. Table 7 below shows variable distances in the state of focusing at infinity and the state of focusing at a close distance.

TABLE 7

[Variable distance data]

| State of focusing | Infinity | Close distance |
|---|---|---|
| f | 391.70138 | — |
| β | — | −0.17681 |
| D0 | ∞ | 2240.0000 |
| D1 | 5.00000 | 20.20240 |
| D2 | 49.92762 | 34.72523 |
| BF | 43.42236 | 43.66559 |

Table 8 below shows values compliant to the conditional expressions in the optical system OL2. The specific lens Lp in Conditional Expressions (6) and (11) is the biconvex positive lens L11.

TABLE 8

[Values compliant to conditional expressions]

(1) θgFp + 0.0017 × vdp = 0.64
(2) ndp = 1.46
(3) vdp = 67.8
(4) TLpf/TL = 0.749
(5) ω = 3.125°
(6) fp/f = 0.71
(7) f/fpf = 0.034
(8) TL/f = 0.66

TABLE 8-continued

[Values compliant to conditional expressions]

(9) (−f2)/f = 0.42
(10) f1/f = 0.36
(11) fp/f1 = 2.01

As described above, the optical system OL2 satisfies Conditional Expressions (1) to (11) described above.

FIG. 4 shows a spherical aberration diagram, an astigmatism diagram, a distortion diagram, a lateral chromatic aberration diagram, and a coma aberration diagram of the optical system OL2 upon focusing on infinity. The aberration diagrams show that the optical system OL2 allows satisfactory correction of the variety of aberrations and provides excellent imaging performance.

Third Example

FIG. 5 shows a configuration of an optical system OL3 according to a third example. The optical system OL3 includes a first lens group G1 having positive refractive power, a second lens group G2 having negative refractive power, the aperture stop S, and a third lens group G3 having negative refractive power sequentially arranged from the object side, and when changing focus from infinity to an object at a close distance, the second lens group G2 is moved as the focusing group Gf along the optical axis toward the image side for focusing.

The first lens group G1 includes a positive meniscus lens L11 having a convex surface facing the object side, a cemented negative lens formed of a biconvex positive lens L12 and a biconcave negative lens L13 cemented to each other, a positive meniscus lens L14 having a convex surface facing the object side and an image-side lens surface on which an intimate-contact-multilayer diffractive optical element GD made of two different types of material is formed, and a cemented negative lens formed of a negative meniscus lens L15 having a convex surface facing the object side and a positive meniscus lens L16 having a convex surface facing the object side with the lenses L15 and L16 cemented to each other, with the lenses L11 to L16 sequentially arranged from the object side. The second lens group G2 is formed of a cemented negative lens formed of a biconvex positive lens L21 and a biconcave negative lens L22 sequentially arranged from the object side and cemented to each other. The third lens group G3 is formed of a cemented negative lens formed of a negative meniscus lens L31 having a convex surface facing the object side and a positive meniscus lens L32 having a convex surface facing the object side with the lenses L31 and L32 cemented to each other, a cemented negative lens formed of a biconvex positive lens L33 and a biconcave negative lens L34 cemented to each other, a biconcave negative lens L35, a cemented positive lens formed of a biconvex lens L36 and a negative meniscus lens L37 having a convex surface facing the image side with the lenses L36 and L37 cemented to each other, a cemented negative lens formed of a biconcave negative lens L38 and a positive meniscus lens L39 having a convex surface facing the object side with the lenses L38 and L39 cemented to each other, and a cemented positive lens formed of a biconvex positive lens L310 and a negative meniscus lens L311 having a convex surface facing the image side with the lenses L310 and L311 cemented to each other, with the lenses L31 to L311 sequentially arranged from the object side. In the optical system OL3, the specific lens Lp is formed of the positive meniscus lens L11 and the biconvex positive lens L12.

The optical system OL3 according to the third example is so configured that the cemented negative lens formed of the biconvex positive lens L33 and the biconcave negative lens L34 cemented to each other and the biconcave negative lens L35 in the third lens group G3 form a vibration-proof lens Gvr and the vibration-proof lens Gvr is so moved as to have a displacement component in a direction perpendicular to the optical axis for correction of a change in the image position resulting, for example, from vibration of the optical system OL3.

Table 9 below shows the values of a variety of parameters of the optical system OL3.

TABLE 9

Third example
[Overall Parameters]
f = 391.55683
FNO = 5.76338
ω = 3.12572
TL = 229.31850

[Lens data]

| m | r | d | vd | nd | θgF |
|---|---|---|---|---|---|
| Object plane | ∞ | D0 | | | |
| 1 | 87.2177 | 9.3393 | 67.81 | 1.458440 | 0.5277 |
| 2 | 4383.2112 | 0.2500 | | | |
| 3 | 120.0972 | 9.4694 | 67.81 | 1.458440 | 0.5277 |
| 4 | −221.6786 | 2.5000 | 44.46 | 1.612660 | 0.5640 |
| 5 | 184.6248 | 2.5000 | | | |
| 6 | 92.2025 | 5.7081 | 64.13 | 1.516800 | 0.5357 |
| 7 | 205.1554 | 0.2000 | 33.36 | 1.527800 | 0.6291 |
| 8* | 205.1554 | 0.3000 | 49.98 | 1.557147 | 0.5688 |
| 9 | 205.1554 | 14.9945 | | | |
| 10 | 56.8204 | 2.0000 | 42.73 | 1.834810 | 0.5648 |
| 11 | 33.3208 | 10.3062 | 70.32 | 1.487490 | 0.5291 |
| 12 | 97.1405 | D1 | | | |
| 13 | 134.4152 | 3.4151 | 33.72 | 1.647690 | 0.5930 |
| 14 | −380.9586 | 1.7000 | 50.27 | 1.719990 | 0.5527 |
| 15 | 69.3195 | D2 | | | |
| 16 | 0.0000 | 3.0000 | | | Aperture stop |
| 17 | 186.9207 | 3.0000 | 46.59 | 1.816000 | 0.5567 |
| 18 | 22.9833 | 4.2254 | 58.82 | 1.518230 | 0.5449 |
| 19 | 334.1726 | 4.7815 | | | |
| 20 | 325.7828 | 3.6000 | 25.45 | 1.805180 | 0.6157 |
| 21 | −105.8775 | 1.5000 | 67.90 | 1.593190 | 0.5440 |
| 22 | 54.7317 | 4.0000 | | | |
| 23 | −234.4716 | 1.5000 | 67.90 | 1.593190 | 0.5440 |
| 24 | 71.7788 | 4.0000 | | | |
| 25 | 36.1881 | 6.9901 | 39.21 | 1.595510 | 0.5806 |
| 26 | −24.2948 | 2.0000 | 82.57 | 1.497820 | 0.5386 |
| 27 | −100.0266 | 5.0000 | | | |
| 28 | −94.0793 | 2.0000 | 46.59 | 1.816000 | 0.5567 |
| 29 | 21.6430 | 4.1037 | 44.46 | 1.612660 | 0.5640 |
| 30 | 44.4968 | 3.1261 | | | |
| 31 | 36.2253 | 10.8162 | 39.21 | 1.595510 | 0.5806 |
| 32 | −23.2887 | 2.0000 | 22.74 | 1.808090 | 0.6287 |
| 33 | −84.8031 | BF | | | |
| Image plane | ∞ | | | | |

[Focal length of lens groups]

| Lens group | First surface | Focal length |
|---|---|---|
| First lens group | 1 | 120.2 |
| Second lens group | 13 | −178.4 |
| Third lens group | 17 | −73.4 |

In the optical system OL3, the eighth surface is the diffractive optical surface. Table 10 below shows data on the diffractive optical surface.

TABLE 10

[Data on diffractive optical surface]

| m | λ0 | n | C2 | C4 |
|---|----|---|----|----|
| 8 | 587.6 | 1.0 | −5.00000E−05 | 3.00000E−10 |

In the optical system OL3, the on-axis air space D0 between the object and the first lens group G1, the on-axis air space D1 between the first lens group G1 and the second lens group G2, the on-axis air space D2 between the second lens group G2 and the third lens group G3, and the back focal length BF change when focusing. Table 11 below shows variable distances in the state of focusing at infinity and the state of focusing at a close distance.

TABLE 11

[Variable distance data]

| State of focusing | Infinity | Close distance |
|---|---|---|
| f | 391.55683 | — |
| β | — | −0.22229 |
| D0 | ∞ | 1770.0000 |
| D1 | 10.30015 | 27.23152 |
| D2 | 43.51142 | 26.63006 |
| BF | 43.71216 | 43.71217 |

Table 12 below shows values compliant to the conditional expressions in the optical system OL3. The specific lens Lp in Conditional Expressions (6) and (11) is formed of the positive meniscus lens L11 and the biconvex positive lens L12.

TABLE 12

[Values compliant to conditional expressions]

(1) θgFp + 0.0017 × vdp = 0.64
(2) ndp = 1.46
(3) vdp = 67.8
(4) TLpf/TL = 0.845
(5) ω = 3.126°
(6) fp/f = 0.44
(7) f/fpf = 0.039
(8) TL/f = 0.59
(9) (−f2)/f = 0.46
(10) f1/f = 0.31
(11) fp/f1 = 1.43

As described above, the optical system OL3 satisfies Conditional Expressions (1) to (11) described above.

FIG. 6 shows a spherical aberration diagram, an astigmatism diagram, a distortion diagram, a lateral chromatic aberration diagram, and a coma aberration diagram of the optical system OL3 upon focusing on infinity. The aberration diagrams show that the optical system OL3 allows satisfactory correction of the variety of aberrations and provides excellent imaging performance.

Fourth Example

FIG. 7 shows a configuration of an optical system OL4 according to a fourth example. The optical system OL4 includes a first lens group G1 having positive refractive power, a second lens group G2 having negative refractive power, the aperture stop S, and a third lens group G3 having negative refractive power sequentially arranged from the object side, and when changing focus from infinity to an object at a close distance, the second lens group G2 is moved as the focusing group Gf along the optical axis toward the image side for focusing.

The first lens group G1 includes a biconvex positive lens L11, a biconvex positive lens L12, a biconcave negative lens L13, a positive meniscus lens L14 having a convex surface facing the object side and an image-side lens surface on which an intimate-contact-multilayer diffractive optical element GD made of two different types of material is formed, and a cemented negative lens formed of a negative meniscus lens L15 having a convex surface facing the object side and a positive meniscus lens L16 having a convex surface facing the object side with the lenses L15 and L16 cemented to each other, with the lenses L11 to L16 sequentially arranged from the object side. The second lens group G2 is formed of a cemented negative lens formed of a biconvex positive lens L21 and a biconcave negative lens L22 sequentially arranged from the object side and cemented to each other. The third lens group G3 is formed of a cemented negative lens formed of a biconcave negative lens L31 and a biconvex positive lens L32 cemented to each other, a cemented negative lens formed of a biconvex positive lens L33 and a biconcave negative lens L34 cemented to each other, a biconcave negative lens L35, a cemented positive lens formed of a biconvex positive lens L36 and a negative meniscus lens L37 having a convex surface facing the image side with the lenses L36 and L37 cemented to each other, a cemented negative lens formed of a biconcave negative lens L38 and a biconvex positive lens L39 cemented to each other, and a cemented positive lens formed of a biconvex positive lens L310 and a negative meniscus lens L311 having a convex surface facing the image side with the lenses L310 and L311 cemented to each other, with the lenses L31 to L311 sequentially arranged from the object side. In the optical system OL4, the specific lens Lp is formed of the biconvex positive lens L11 and the biconvex positive lens L12.

The optical system OL4 according to the fourth example is so configured that the cemented negative lens formed of the biconvex positive lens L33 and the biconcave negative lens L34 cemented to each other and the biconcave negative lens L35 in the third lens group G3 form a vibration-proof lens Gvr and the vibration-proof lens Gvr is so moved as to have a displacement component in a direction perpendicular to the optical axis for correction of a change in the image position resulting, for example, from vibration of the optical system OL4.

Table 13 below shows the values of a variety of parameters of the optical system OL4.

TABLE 13

Fourth example
[Overall Parameters]
f = 489.82327
FNO = 5.78086
ω = 2.51213
TL = 279.32359

[Lens data]

| m | r | d | νd | nd | θgF |
|---|---|---|---|---|---|
| Object plane | ∞ | D0 | | | |
| 1 | 204.8068 | 9.1948 | 67.81 | 1.458440 | 0.5277 |
| 2 | −3533.1639 | 0.1000 | | | |
| 3 | 111.8695 | 15.9913 | 67.81 | 1.458440 | 0.5277 |
| 4 | −311.7558 | 2.5000 | | | |
| 5 | −309.5538 | 3.3400 | 44.46 | 1.612660 | 0.5640 |
| 6 | 435.5169 | 6.9234 | | | |
| 7 | 93.5593 | 9.5000 | 64.13 | 1.516800 | 0.5356 |
| 8 | 182.0193 | 0.2000 | 33.36 | 1.527800 | 0.6291 |
| 9* | 182.0193 | 0.3000 | 49.98 | 1.557147 | 0.5688 |
| 10 | 182.0193 | 12.7961 | | | |
| 11 | 104.4147 | 3.0786 | 40.66 | 1.883000 | 0.5668 |
| 12 | 48.8390 | 9.5535 | 82.57 | 1.497820 | 0.5386 |
| 13 | 186.1971 | D1 | | | |
| 14 | 269.1019 | 3.0854 | 32.18 | 1.672700 | 0.5973 |
| 15 | −331.7517 | 2.0000 | 50.27 | 1.719990 | 0.5527 |
| 16 | 83.6409 | D2 | | | |
| 17 | 0.0000 | 4.6833 | | | Aperture stop |
| 18 | −151.5099 | 1.3000 | 46.59 | 1.816000 | 0.5567 |
| 19 | 56.8694 | 4.2649 | 58.82 | 1.518230 | 0.5449 |
| 20 | −56.8694 | 13.6031 | | | |
| 21 | 55.0331 | 3.6000 | 36.40 | 1.620040 | 0.5878 |
| 22 | −66.6260 | 1.4032 | 82.57 | 1.497820 | 0.5386 |
| 23 | 34.1372 | 3.0000 | | | |
| 24 | −93.6757 | 1.3000 | 67.90 | 1.593190 | 0.5440 |
| 25 | 55.0638 | 5.0000 | | | |
| 26 | 35.3875 | 6.5475 | 40.98 | 1.581440 | 0.5763 |
| 27 | −28.9590 | 1.5000 | 82.57 | 1.497820 | 0.5386 |
| 28 | −7177.8637 | 10.0000 | | | |
| 29 | −47.3374 | 2.0000 | 46.59 | 1.816000 | 0.5567 |
| 30 | 37.1029 | 4.7800 | 44.46 | 1.612660 | 0.5640 |
| 31 | −115.4992 | 0.5000 | | | |
| 32 | 71.4039 | 7.6921 | 40.98 | 1.581440 | 0.5763 |
| 33 | −25.4510 | 2.0000 | 22.74 | 1.808090 | 0.6287 |
| 34 | −103.0667 | BF | | | |
| Image plane | ∞ | | | | |

[Focal length of lens groups]

| Lens group | First surface | Focal length |
|---|---|---|
| First lens group | 1 | 162.4 |
| Second lens group | 14 | −161.6 |
| Third lens group | 18 | −120.6 |

In the optical system OL4, the ninth surface is the diffractive optical surface. Table 14 below shows data on the diffractive optical surface.

TABLE 14

[Data on diffractive optical surface]

| m | λ0 | n | C2 | C4 |
|---|---|---|---|---|
| 9 | 587.6 | 1.0 | −4.06169E−05 | 3.00000E−10 |

In the optical system OL4, the on-axis air space D0 between the object and the first lens group G1, the on-axis air space D1 between the first lens group G1 and the second lens group G2, the on-axis air space D2 between the second lens group G2 and the third lens group G3, and the back focal length BF change when focusing. Table 15 below shows variable distances in the state of focusing at infinity and the state of focusing at a close distance.

TABLE 15

[Variable distance data]

| State of focusing | Infinity | Close distance |
|---|---|---|
| f | 489.82327 | — |
| β | — | −0.18048 |
| D0 | ∞ | 2719.9994 |

TABLE 15-continued

[Variable distance data]

| State of focusing | Infinity | Close distance |
|---|---|---|
| D1 | 32.86181 | 49.68961 |
| D2 | 28.05274 | 11.32494 |
| BF | 66.67169 | 66.69529 |

Table 16 below shows values compliant to the conditional expressions in the optical system OL4. The specific lens Lp in Conditional Expressions (6) and (11) is formed of the biconvex positive lens L11 and the biconvex positive lens L12.

TABLE 16

[Values compliant to conditional expressions]

(1) θgFp + 0.0017 × νdp = 0.64
(2) ndp = 1.46
(3) νdp = 67.8
(4) TLpf/TL = 0.829
(5) ω = 2.512°
(6) fp/f = 0.37
(7) f/fpf = 0.040
(8) TL/f = 0.57
(9) (−f2)/f = 0.33
(10) f1/f = 0.33
(11) fp/f1 = 1.12

As described above, the optical system OL4 satisfies Conditional Expressions (1) to (11) described above.

FIG. 8 shows a spherical aberration diagram, an astigmatism diagram, a distortion diagram, a lateral chromatic aberration diagram, and a coma aberration diagram of the optical system OL4 upon focusing on infinity. The aberration diagrams show that the optical system OL4 allows satisfactory correction of the variety of aberrations and provides excellent imaging performance.

Fifth Embodiment

FIG. 9 shows a configuration of an optical system OL5 according to a fifth example. The optical system OL5 includes a first lens group G1 having positive refractive power, a second lens group G2 having negative refractive power, the aperture stop S, and a third lens group G3 having negative refractive power sequentially arranged from the object side, and when changing focus from infinity to an object at a close distance, the second lens group G2 is moved as the focusing group Gf along the optical axis toward the image side for focusing.

The first lens group G1 includes a biconvex positive lens L11, a negative meniscus lens L12 having a convex surface facing the image side, a biconvex positive lens L13, a positive meniscus lens L14 having a convex surface facing the object side and an image-side lens surface on which an intimate-contact-multilayer diffractive optical element GD made of two different types of material is formed, and a cemented negative lens formed of a negative meniscus lens L15 having a convex surface facing the object side and a positive meniscus lens L16 having a convex surface facing the object side with the lenses L15 and L16 cemented to each other, with the lenses L11 to L16 sequentially arranged from the object side. The second lens group G2 is formed of a cemented negative lens formed of a positive meniscus lens L21 having a convex surface facing the object side and a negative meniscus lens L22 having a convex surface facing the object side sequentially arranged from the object side and cemented to each other. The third lens group G3 is formed of a cemented negative lens formed of a negative meniscus lens L31 having a convex surface facing the object side and a positive meniscus lens L32 having a convex surface facing the object side with the lenses L31 and L32 cemented to each other, a cemented negative lens formed of a biconvex positive lens L33 and a biconcave negative lens L34 cemented to each other, a biconcave negative lens L35, a cemented positive lens formed of a biconvex positive lens L36 and a negative meniscus lens L37 having a convex surface facing the image side with the lenses L36 and L37 cemented to each other, a cemented negative lens formed of a biconcave negative lens L38 and a positive meniscus lens L39 having a convex surface facing the object side with the lenses L38 and L39 cemented to each other, and a cemented positive lens formed of a biconvex positive lens L310 and a negative meniscus lens L311 having a convex surface facing the image side with the lenses L310 and L311 cemented to each other, with the lenses L31 to L311 sequentially arranged from the object side. In the optical system OL5, the specific lens Lp is formed of the biconvex positive lens L11 and the biconvex positive lens L13.

The optical system OL5 according to the fifth example is so configured that the cemented negative lens formed of the biconvex positive lens L33 and the biconcave negative lens L34 cemented to each other and the biconcave negative lens L35 in the third lens group G3 form a vibration-proof lens Gvr and the vibration-proof lens Gvr is so moved as to have a displacement component in a direction perpendicular to the optical axis for correction of a change in the image position resulting, for example, from vibration of the optical system OL5.

Table 17 below shows the values of a variety of parameters of the optical system OL5.

TABLE 17

Fifth example
[Overall Parameters]
f = 488.59872
FNO = 5.76786
ω = 2.50598
TL = 279.31876

[Lens data]

| m | r | d | νd | nd | θgF |
|---|---|---|---|---|---|
| Object plane | ∞ | D0 | | | |
| 1 | 222.9609 | 10.0000 | 67.81 | 1.458440 | 0.5277 |
| 2 | −435.6133 | 15.0000 | | | |
| 3 | −174.9681 | 3.3400 | 44.46 | 1.612660 | 0.5640 |
| 4 | −664.9959 | 0.1000 | | | |
| 5 | 134.3167 | 12.0000 | 67.81 | 1.458440 | 0.5277 |
| 6 | −390.8474 | 0.1000 | | | |
| 7 | 73.6380 | 9.0000 | 64.13 | 1.516800 | 0.5356 |
| 8 | 176.1958 | 0.2000 | 33.36 | 1.527800 | 0.6291 |
| 9* | 176.1958 | 0.3000 | 49.98 | 1.557147 | 0.5688 |
| 10 | 176.1958 | 26.0240 | | | |
| 11 | 155.5870 | 2.7000 | 40.66 | 1.883000 | 0.5668 |
| 12 | 41.1378 | 11.0000 | 70.32 | 1.487490 | 0.5291 |
| 13 | 443.3927 | D1 | | | |
| 14 | 137.8302 | 3.5000 | 33.72 | 1.647690 | 0.5930 |
| 15 | 1091.1076 | 2.0000 | 46.59 | 1.816000 | 0.5647 |
| 16 | 73.0993 | D2 | | | |
| 17 | 0.0000 | 4.5000 | | | Aperture stop |
| 18 | 69.2796 | 3.0000 | 46.59 | 1.816000 | 0.5567 |
| 19 | 31.6488 | 4.5000 | 58.82 | 1.518230 | 0.5449 |
| 20 | 98.3205 | 5.0000 | | | |
| 21 | 84.0035 | 4.0000 | 36.40 | 1.620040 | 0.5878 |

TABLE 17-continued

Fifth example
[Overall Parameters]
f = 488.59872
FNO = 5.76786
ω = 2.50598
TL = 279.31876

| | | | | | |
|---|---|---|---|---|---|
| 22 | −94.0505 | 2.0000 | 82.57 | 1.497820 | 0.5386 |
| 23 | 46.2212 | 3.0000 | | | |
| 24 | −151.1635 | 1.2000 | 67.90 | 1.593190 | 0.5440 |
| 25 | 63.9888 | 5.0000 | | | |
| 26 | 51.2529 | 8.0000 | 34.59 | 1.638326 | 0.5868 |
| 27 | −40.2777 | 3.0000 | 82.57 | 1.497820 | 0.5386 |
| 28 | −419.5901 | 10.0000 | | | |
| 29 | −77.4353 | 2.0000 | 46.59 | 1.816000 | 0.5567 |
| 30 | 27.2888 | 5.0000 | 44.46 | 1.612660 | 0.5640 |
| 31 | 83.8874 | 0.5000 | | | |
| 32 | 46.0842 | 8.0000 | 65.04 | 1.496840 | 0.5342 |
| 33 | −40.4871 | 2.0000 | 22.74 | 1.808090 | 0.6287 |
| 34 | −66.2472 | BF | | | |
| Image plane | ∞ | | | | |

[Focal length of lens groups]

| Lens group | First surface | Focal length |
|---|---|---|
| First lens group | 1 | 163.0 |
| Second lens group | 14 | −162.9 |
| Third lens group | 18 | −118.5 |

In the optical system OL5, the ninth surface is the diffractive optical surface. Table 18 below shows data on the diffractive optical surface.

TABLE 18

[Data on diffractive optical surface]

| m | λ0 | n | C2 | C4 |
|---|---|---|---|---|
| 9 | 587.6 | 1.0 | −4.50000E−05 | 3.00000E−10 |

In the optical system OL5, the on-axis air space D0 between the object and the first lens group G1, the on-axis air space D1 between the first lens group G1 and the second lens group G2, the on-axis air space D2 between the second lens group G2 and the third lens group G3, and the back focal length BF change when focusing. Table 19 below shows variable distances in the state of focusing at infinity and the state of focusing at a close distance.

TABLE 19

[Variable distance data]

| State of focusing | Infinity | Close distance |
|---|---|---|
| f | 488.59872 | — |
| β | — | −0.18050 |
| D0 | ∞ | 2719.9994 |
| D1 | 16.16533 | 33.07460 |
| D2 | 35.18924 | 18.27997 |
| BF | 62.00019 | 62.00019 |

Table 20 below shows values compliant to the conditional expressions in the optical system OL5. The specific lens Lp in Conditional Expressions (6) and (11) is formed of the biconvex positive lens L11 and the biconvex positive lens L13.

TABLE 20

[Values compliant to conditional expressions]

| | |
|---|---|
| (1) | θgFp + 0.0017 × vdp = 0.64 |
| (2) | ndp = 1.46 |
| (3) | vdp = 67.8 |
| (4) | TLpf/TL = 0.822 |
| (5) | ω = 2.506° |
| (6) | fp/f = 0.45 |
| (7) | f/fpf = 0.044 |
| (8) | TL/f = 0.57 |
| (9) | (−f2)/f = 0.33 |
| (10) | f1/f = 0.33 |
| (11) | fp/f1 = 1.35 |

As described above, the optical system OL5 satisfies Conditional Expressions (1) to (11) described above.

FIG. 10 shows a spherical aberration diagram, an astigmatism diagram, a distortion diagram, a lateral chromatic aberration diagram, and a coma aberration diagram of the optical system OL5 upon focusing on infinity. The aberration diagrams show that the optical system OL5 allows satisfactory correction of the variety of aberrations and provides excellent imaging performance.

Sixth Embodiment

FIG. 11 shows a configuration of an optical system OL6 according to a sixth example. The optical system OL6 includes a first lens group G1 having positive refractive power, a second lens group G2 having negative refractive power, the aperture stop S, and a third lens group G3 having negative refractive power sequentially arranged from the object side, and when changing focus from infinity to an object at a close distance, the second lens group G2 is moved as the focusing group Gf along the optical axis toward the image side for focusing.

The first lens group G1 includes a biconvex positive lens L11, a cemented negative lens formed of a biconvex positive lens L12 and a biconcave negative lens L13 cemented to each other, a positive meniscus lens L14 having a convex surface facing the object side and an image-side lens surface on which an intimate-contact-multilayer diffractive optical element GD made of two different types of material is formed, and a cemented negative lens formed of a negative meniscus lens L15 having a convex surface facing the object side and a positive meniscus lens L16 having a convex surface facing the object side with the lenses L15 and L16 cemented to each other, with the lenses L11 to L16 sequentially arranged from the object side. The second lens group G2 is formed of a cemented negative lens formed of a biconvex positive lens L21 and a biconcave negative lens L22 sequentially arranged from the object side and cemented to each other. The third lens group G3 is formed of a cemented negative lens formed of a biconcave negative lens L31 and a biconvex positive lens L32 cemented to each other, a cemented negative lens formed of a biconvex positive lens L33 and a biconcave negative lens L34 cemented to each other, a biconcave negative lens L35, a cemented positive lens formed of a biconvex positive lens L36 and a negative meniscus lens L37 having a convex surface facing the image side with the lenses L36 and L37 cemented to each other, a cemented negative lens formed of a biconcave negative lens L38 and a biconvex positive lens L39 cemented to each other, and a cemented positive lens formed of a biconvex positive lens L310 and a negative meniscus lens L311 having a convex surface facing the image side with the lenses L310 and L311 cemented to each other, with the lenses L31 to L311 sequentially arranged from the object side. In the optical system OL6, the specific lens Lp is formed of the biconvex positive lens L11 and the biconvex positive lens L12.

The optical system OL6 according to the sixth example is so configured that the cemented negative lens formed of the biconvex positive lens L33 and the biconcave negative lens L34 cemented to each other and the biconcave negative lens L35 in the third lens group G3 form a vibration-proof lens Gvr and the vibration-proof lens Gvr is so moved as to have a displacement component in a direction perpendicular to the optical axis for correction of a change in the image position resulting, for example, from vibration of the optical system OL6.

Table 21 below shows the values of a variety of parameters of the optical system OL6.

In the optical system OL6, the eighth surface is the diffractive optical surface. Table 22 below shows data on the diffractive optical surface.

TABLE 22

[Data on diffractive optical surface]

| m | λ0 | n | C2 | C4 |
|---|-----|-----|--------------|---------------|
| 8 | 587.6 | 1.0 | −3.60956E−05 | −2.00647E−12 |

In the optical system OL6, the on-axis air space D0 between the object and the first lens group G1, the on-axis

TABLE 21

Sixth example
[Overall Parameters]
f = 587.61216
FNO = 5.77779
ω = 2.09733
TL = 332.31886

[Lens data]

| m | r | d | νd | nd | θgF |
|---|---|---|----|----|-----|
| Object plane | ∞ | D0 | | | |
| 1 | 324.2990 | 12.0000 | 67.81 | 1.458440 | 0.5277 |
| 2 | −433.6786 | 3.0000 | | | |
| 3 | 172.1224 | 16.0000 | 67.81 | 1.458440 | 0.5277 |
| 4 | −331.2587 | 5.0000 | 44.46 | 1.612660 | 0.564 |
| 5 | 235.0595 | 5.0000 | | | |
| 6 | 99.5891 | 15.0000 | 64.13 | 1.516800 | 0.5356 |
| 7 | 231.2035 | 0.2000 | 33.36 | 1.527800 | 0.6291 |
| 8* | 231.2035 | 0.3000 | 49.98 | 1.557147 | 0.5688 |
| 9 | 231.2035 | 40.0000 | | | |
| 10 | 80.5292 | 4.0000 | 40.66 | 1.883000 | 0.5668 |
| 11 | 47.4250 | 12.0049 | 70.32 | 1.487490 | 0.5291 |
| 12 | 136.8492 | D1 | | | |
| 13 | 245.0048 | 4.0428 | 33.72 | 1.647690 | 0.593 |
| 14 | −225.7583 | 3.0000 | 50.27 | 1.719990 | 0.5527 |
| 15 | 84.8341 | D2 | | | |
| 16 | 0.0000 | 4.6833 | | | Aperture stop |
| 17 | −485.6445 | 3.0000 | 46.59 | 1.816000 | 0.5567 |
| 18 | 47.9692 | 4.2775 | 58.82 | 1.518230 | 0.5449 |
| 19 | −70.4059 | 5.0000 | | | |
| 20 | 60.1829 | 4.4075 | 36.40 | 1.620040 | 0.5878 |
| 21 | −80.3943 | 2.0000 | 82.57 | 1.497820 | 0.5386 |
| 22 | 35.8054 | 4.0000 | | | |
| 23 | −102.3684 | 1.2000 | 67.90 | 1.593190 | 0.544 |
| 24 | 56.7764 | 5.0000 | | | |
| 25 | 36.9282 | 8.3851 | 41.51 | 1.575010 | 0.5765 |
| 26 | −32.0701 | 3.0000 | 82.57 | 1.497820 | 0.5386 |
| 27 | −405.6941 | 8.2456 | | | |
| 28 | −61.4811 | 2.0000 | 46.59 | 1.816000 | 0.5567 |
| 29 | 32.1605 | 4.8352 | 44.46 | 1.612660 | 0.564 |
| 30 | −3472.8990 | 0.5000 | | | |
| 31 | 62.0741 | 7.8089 | 40.98 | 1.581440 | 0.5763 |
| 32 | −27.0299 | 3.0000 | 22.74 | 1.808090 | 0.6287 |
| 33 | −98.6660 | BF | | | |
| Image plane | ∞ | | | | |

[Focal length of lens groups]

| Lens group | First surface | Focal length |
|---|---|---|
| First lens group | 1 | 197.5 |
| Second lens group | 13 | −164.7 |
| Third lens group | 17 | −137.5 | air space D1 between the first lens group G1 and the second lens group G2, the on-axis air space D2 between the second lens group G2 and the third lens group G3, and the back focal length BF change when focusing. Table 23 below shows variable distances in the state of focusing at infinity and the state of focusing at a close distance.

TABLE 23

[Variable distance data]

| State of focusing | Infinity | Close distance |
|---|---|---|
| f | 587.61216 | — |
| β | — | −0.15998 |
| D0 | ∞ | 3666.9991 |
| D1 | 29.66812 | 46.79181 |
| D2 | 45.78410 | 28.72041 |
| BF | 65.97569 | 65.97568 |

Table 24 below shows values compliant to the conditional expressions in the optical system OL6. The specific lens Lp in Conditional Expressions (6) and (11) is formed of the biconvex positive lens L11 and the biconvex positive lens L12.

TABLE 24

[Values compliant to conditional expressions]

| | |
|---|---|
| (1) | θgFp + 0.0017 × vdp = 0.64 |
| (2) | ndp = 1.46 |
| (3) | vdp = 67.8 |
| (4) | TLpf/TL = 0.831 |
| (5) | ω = 2.097° |
| (6) | fp/f = 0.42 |
| (7) | f/fpf = 0.042 |
| (8) | TL/f = 0.57 |
| (9) | (−f2)/f = 0.28 |
| (10) | f1/f = 0.34 |
| (11) | fp/f1 = 1.26 |

As described above, the optical system OL6 satisfies Conditional Expressions (1) to (11) described above.

FIG. 12 shows a spherical aberration diagram, an astigmatism diagram, a distortion diagram, a lateral chromatic aberration diagram, and a coma aberration diagram of the optical system OL6 upon focusing on infinity. The aberration diagrams show that the optical system OL6 allows satisfactory correction of the variety of aberrations and provides excellent imaging performance.

Seventh Embodiment

FIG. 13 shows a configuration of an optical system OL7 according to a seventh example. The optical system OL7 includes a first lens group G1 having positive refractive power, a second lens group G2 having negative refractive power, the aperture stop S, and a third lens group G3 having negative refractive power sequentially arranged from the object side, and when changing focus from infinity to an object at a close distance, the second lens group G2 is moved as the focusing group Gf along the optical axis toward the image side for focusing.

The first lens group G1 includes a biconvex positive lens L11, a cemented positive lens formed of a biconvex positive lens L12 and a biconcave negative lens L13 cemented to each other, a positive meniscus lens L14 having a convex surface facing the object side and an image-side lens surface on which an intimate-contact-multilayer diffractive optical element GD made of two different types of material is formed, and a cemented negative lens formed of a negative meniscus lens L15 having a convex surface facing the object side and a positive meniscus lens L16 having a convex surface facing the object side with the lenses L15 and L16 cemented to each other, with the lenses L11 to L16 sequentially arranged from the object side. The second lens group G2 is formed of a cemented negative lens formed of a biconvex positive lens L21 and a biconcave negative lens L22 sequentially arranged from the object side and cemented to each other. The third lens group G3 is formed of a cemented negative lens formed of a biconcave negative lens L31 and a biconvex positive lens L32 cemented to each other, a biconcave negative lens L33, a cemented negative lens formed of a positive meniscus lens L34 having a convex surface facing the image side and a biconcave negative lens L35 with the lenses L34 and L35 cemented to each other, a positive meniscus lens L36 having a convex surface facing the object side, a cemented negative lens formed of a biconvex positive lens L37 and a biconcave negative lens L38 cemented to each other, a cemented positive lens formed of a biconvex positive lens L39 and a biconcave negative lens L310 cemented to each other, a cemented negative lens formed of a biconvex positive lens L311 and a positive meniscus lens L312 having a convex surface facing the object side with the lenses L311 and L312 cemented to each other, and a cemented positive lens formed of a biconvex positive lens L313 and a negative meniscus lens L314 having a convex surface facing the image side with the lenses L313 and L314 cemented to each other, with the lenses L31 to L314 sequentially arranged from the object side. In the optical system OL7, the specific lens Lp is formed of the biconvex positive lens L11 and the biconvex positive lens L12.

The optical system OL7 according to the seventh example is so configured that the biconcave negative lens L33 and the cemented negative lens formed of the positive meniscus lens L34 having a convex surface facing the image side and the biconcave negative lens L35 with the lenses L34 and L35 cemented to each other in the third lens group G3 form a vibration-proof lens Gvr and the vibration-proof lens Gvr is so moved as to have a displacement component in a direction perpendicular to the optical axis for correction of a change in the image position resulting, for example, from vibration of the optical system OL7.

Table 25 below shows the values of a variety of parameters of the optical system OL7.

TABLE 25

Seventh example
[Overall Parameters]
f = 782.77561
FNO = 8.16266
ω = 1.56482
TL = 359.32092

[Lens data]

| m | r | d | vd | nd | θgF | |
|---|---|---|---|---|---|---|
| Object plane | ∞ | D0 | | | | |
| 1 | 226.9255 | 10.7424 | 67.81 | 1.458440 | 0.5277 | |
| 2 | −989.7333 | 0.1000 | | | | |
| 3 | 181.3998 | 13.2172 | 67.81 | 1.458440 | 0.5277 | |
| 4 | −505.3613 | 3.3400 | 44.46 | 1.612660 | 0.5640 | |
| 5 | 664.5070 | 0.1000 | | | | |
| 6 | 118.8290 | 9.5000 | 64.13 | 1.516800 | 0.5356 | |
| 7 | 466.4563 | 0.2000 | 33.36 | 1.527800 | 0.6291 | |
| 8* | 466.4563 | 0.3000 | 49.98 | 1.557147 | 0.5688 | |
| 9 | 466.4563 | 40.0000 | | | | |
| 10 | 393.8512 | 2.7000 | 40.66 | 1.883000 | 0.5668 | |
| 11 | 65.0393 | 9.6422 | 70.32 | 1.487490 | 0.5291 | |
| 12 | 419.9596 | D1 | | | | |
| 13 | 2126.1623 | 3.5000 | 33.72 | 1.647690 | 0.5930 | |
| 14 | −571.9841 | 2.0000 | 50.27 | 1.719990 | 0.5527 | |
| 15 | 187.7815 | D2 | | | | |
| 16 | 0.0000 | 4.6833 | | | | Aperture stop |
| 17 | −154.0354 | 3.0000 | 46.59 | 1.816000 | 0.5567 | |
| 18 | 54.7996 | 4.5000 | 58.82 | 1.518230 | 0.5449 | |
| 19 | −56.1218 | 7.6832 | | | | |
| 20 | −207.4904 | 2.0000 | 67.90 | 1.593190 | 0.5440 | |
| 21 | 125.8893 | 1.5000 | | | | |
| 22 | −335.4755 | 5.0000 | 36.40 | 1.620040 | 0.5878 | |
| 23 | −41.8379 | 2.0000 | 82.57 | 1.497820 | 0.5386 | |
| 24 | 83.1108 | 5.0000 | | | | |
| 25 | 31.7152 | 7.0000 | 70.32 | 1.487490 | 0.5291 | |
| 26 | 161.1729 | 12.4523 | | | | |
| 27 | 57.8643 | 6.0000 | 41.51 | 1.575010 | 0.5765 | |
| 28 | −40.8391 | 2.0000 | 82.57 | 1.497820 | 0.5386 | |
| 29 | 27.8758 | 0.4145 | | | | |
| 30 | 32.9458 | 7.0000 | 44.46 | 1.612660 | 0.5640 | |
| 31 | −25.2871 | 2.0000 | 46.59 | 1.816000 | 0.5567 | |
| 32 | 12183.2050 | 6.1961 | | | | |
| 33 | −60.4074 | 2.0000 | 46.59 | 1.816000 | 0.5567 | |
| 34 | 21.2687 | 5.0000 | 44.46 | 1.612660 | 0.5640 | |
| 35 | 59.8801 | 1.0000 | | | | |
| 36 | 35.8476 | 10.0000 | 40.98 | 1.581440 | 0.5763 | |
| 37 | −27.2356 | 2.0000 | 22.74 | 1.808090 | 0.6287 | |
| 38 | −129.6802 | BF | | | | |
| Image plane | ∞ | | | | | |

[Focal length of lens groups]

| Lens group | First surface | Focal length |
|---|---|---|
| First lens group | 1 | 245.5 |
| Second lens group | 13 | −273.8 |
| Third lens group | 17 | −81.3 |

In the optical system OL7, the eighth surface is the diffractive optical surface. Table 26 below shows data on the diffractive optical surface.

TABLE 26

[Data on diffractive optical surface]

| m | λ0 | n | C2 | C4 |
|---|-----|-----|-------------|-------------|
| 8 | 587.6 | 1.0 | −3.36077E−05 | 3.32320E−10 |

In the optical system OL7, the on-axis air space D0 between the object and the first lens group G1, the on-axis air space D1 between the first lens group G1 and the second lens group G2, the on-axis air space D2 between the second lens group G2 and the third lens group G3, and the back focal length BF change when focusing. Table 27 below shows variable distances in the state of focusing at infinity and the state of focusing at a close distance.

TABLE 27

[Variable distance data]

| State of focusing | Infinity | Close distance |
|---|---|---|
| f | 782.77561 | — |
| β | — | −0.17047 |
| D0 | ∞ | 4640.0001 |
| D1 | 34.81055 | 59.45586 |
| D2 | 59.84762 | 35.20231 |
| BF | 70.89135 | 70.89057 |

Table 28 below shows values compliant to the conditional expressions in the optical system OL7. The specific lens Lp in Conditional Expressions (6) and (11) is formed of the biconvex positive lens L11 and the biconvex positive lens L12.

TABLE 28

[Values compliant to conditional expressions]

| | |
|---|---|
| (1) | θgFp + 0.0017 × νdp = 0.64 |
| (2) | ndp = 1.46 |
| (3) | νdp = 67.8 |
| (4) | TLpf/TL = 0.896 |
| (5) | ω = 1.565° |
| (6) | fp/f = 0.37 |
| (7) | f/fpf = 0.053 |
| (8) | TL/f = 0.46 |
| (9) | (−f2)/f = 0.35 |
| (10) | f1/f = 0.31 |
| (11) | fp/f1 = 1.20 |

As described above, the optical system OL7 satisfies Conditional Expressions (1) to (11) described above.

FIG. 14 shows a spherical aberration diagram, an astigmatism diagram, a distortion diagram, a lateral chromatic aberration diagram, and a coma aberration diagram of the optical system OL7 upon focusing on infinity. The aberration diagrams show that the optical system OL7 allows satisfactory correction of the variety of aberrations and provides excellent imaging performance.

Eighth Embodiment

FIG. 15 shows a configuration of an optical system OL8 according to an eighth example. The optical system OL8 includes a first lens group G1 having positive refractive power, a second lens group G2 having negative refractive power, and a third lens group G3 having positive refractive power, a fourth lens group G4 having negative refractive power, a fifth lens group G5 having positive refractive power, the aperture stop S, and a sixth lens group G6 having positive refractive power sequentially arranged from the object side, and when changing magnification from the wide-angle end state to the telescopic end state, each of the fourth lens group G4 and the fifth lens group G5 is moved along the optical axis toward the image side, and when changing focus from infinity to an object at a close distance, the second lens group G2 is moved as the focusing group Gf along the optical axis toward the image side for focusing.

The first lens group G1 includes a negative meniscus lens L11 having a convex surface facing the object side, a cemented negative lens formed of a negative meniscus lens L12 having a convex surface facing the object side and a biconvex positive lens L13 with the lenses L12 and L13 cemented to each other, a biconvex positive lens L14, and a positive meniscus lens L15 having a convex surface facing the object side and an image-side lens surface on which an intimate-contact-multilayer diffractive optical element GD made of two different types of material is formed with the lenses L11 to L15 sequentially arranged from the object side. The second lens group G2 is formed of a biconcave negative lens L21 and a cemented negative lens formed of a positive meniscus lens L22 having a convex surface facing the image side and a biconcave negative lens L23 with the lenses L22 and L23 cemented to each other, with the lenses L21 to L23 sequentially arranged from the object side. The third lens group G3 is formed of a positive meniscus lens L31 having a convex surface facing the image side. The fourth lens group G4 is formed of a biconcave negative lens L41, a cemented negative lens formed of a biconvex positive lens L42 and a biconcave negative lens L42 cemented to each other, and a negative meniscus lens L43 having a convex surface facing the image side with the lenses L41 to L43 sequentially arranged from the object side. The fifth lens group G5 is formed of a positive meniscus lens L51 having a convex surface facing the image side and a cemented positive lens formed of a biconvex positive lens L52 and a negative meniscus lens L53 having a convex surface facing the image side with the lenses L52 and L53 cemented to each other with the lenses L51 to L53 sequentially arranged from the object side. The sixth lens group G6 is formed of a cemented positive lens formed of a negative meniscus lens L61 having a convex surface facing the object side and a positive meniscus lens L62 having a convex surface facing the object side with the lenses L61 and L62 cemented to each other, a positive meniscus lens L63 having a convex surface facing the object side, a cemented negative lens formed of a biconvex positive lens L64 and a biconcave negative lens L65 cemented to each other, a biconcave negative lens L66, a positive meniscus lens L67 having a convex surface facing the image side, a cemented positive lens formed of a biconvex positive lens L68 and a negative meniscus lens L69 having a convex surface facing the image side, and a filter FL with the lenses L61 to L69 and the filter FL sequentially arranged from the object side. In the optical system OL8, the specific lens Lp is formed of the biconvex positive lens L13 and the biconvex positive lens L14.

The optical system OL8 according to the eighth example is so configured that the cemented negative lens formed of the biconvex positive lens L64 and the biconcave negative lens L65 cemented to each other and the biconcave negative lens L66 in the sixth lens group G6 form a vibration-proof lens Gvr and the vibration-proof lens Gvr is so moved as to have a displacement component in a direction perpendicular to the optical axis for correction of a change in the image position resulting, for example, from vibration of the optical system OL8.

Table 29 below shows the values of a variety of parameters of the optical system OL8.

TABLE 29

Eighth example

[Overall Parameters]

| State of changing magnification | Wide-angle end | Telescopic end |
|---|---|---|
| f= | 204.00513 to | 391.93795 |
| FNO= | 4.21502 to | 4.21590 |
| ω= | 6.00919 to | 3.11657 |
| TL= | 399.31863 to | 399.31855 |

[Lens data]

| m | r | d | νd | nd | θgF |
|---|---|---|---|---|---|
| Object plane | ∞ | D0 | | | |
| 1 | 2000.2500 | 4.0000 | 64.11 | 1.516800 | 0.5357 |
| 2 | 1998.7500 | 1.9000 | | | |
| 3 | 565.8356 | 5.3000 | 28.69 | 1.795040 | 0.6065 |
| 4 | 135.0772 | 14.0000 | 67.81 | 1.458440 | 0.5277 |
| 5 | −470.8531 | 0.2730 | | | |
| 6 | 143.9670 | 11.0000 | 67.81 | 1.458440 | 0.5277 |
| 7 | −925.6578 | 0.1560 | | | |
| 8 | 147.6091 | 9.5000 | 63.88 | 1.516800 | 0.5360 |
| 9 | 596.6127 | 0.2000 | 33.43 | 1.527793 | 0.6331 |
| 10* | 730.7648 | 0.2000 | 49.78 | 1.557095 | 0.5627 |
| 11 | 618.3970 | D1 | | | |
| 12 | −271.6692 | 2.9000 | 47.35 | 1.788000 | 0.5559 |
| 13 | 127.4240 | 9.0000 | | | |
| 14 | −774.9650 | 4.0000 | 23.78 | 1.846660 | 0.6204 |
| 15 | −145.0491 | 2.9000 | 65.46 | 1.603001 | 0.5405 |
| 16 | 905.9351 | D2 | | | |
| 17 | −213.9412 | 5.4000 | 39.58 | 1.804398 | 0.5728 |
| 18 | −100.7028 | D3 | | | |
| 19 | −864.5308 | 1.9000 | 55.52 | 1.696797 | 0.5432 |
| 20 | 108.8847 | 2.0540 | | | |
| 21 | 792.4622 | 4.5000 | 23.78 | 1.846660 | 0.6204 |
| 22 | −82.8503 | 1.9000 | 60.09 | 1.639999 | 0.5376 |
| 23 | 114.7210 | 3.9430 | | | |
| 24 | −70.6181 | 1.9000 | 60.09 | 1.639999 | 0.5376 |
| 25 | −1030.5263 | D4 | | | |
| 26 | −400.0133 | 3.5000 | 65.46 | 1.603001 | 0.5405 |
| 27 | −124.8088 | 0.5000 | | | |
| 28 | 166.2045 | 6.0000 | 65.46 | 1.603001 | 0.5405 |
| 29 | −68.2288 | 1.9000 | 28.54 | 1.795040 | 0.6074 |
| 30 | −168.6990 | D5 | | | |
| 31 | 0.0000 | 1.0000 | | | Aperture stop |
| 32 | 78.8152 | 2.0000 | 33.89 | 1.803840 | 0.5907 |
| 33 | 57.6163 | 4.5000 | 65.46 | 1.603001 | 0.5405 |
| 34 | 745.7267 | 0.1000 | | | |
| 35 | 81.7625 | 4.0000 | 65.46 | 1.603001 | 0.5405 |
| 36 | 162.6622 | 24.4126 | | | |
| 37 | 947.9766 | 3.3000 | 23.78 | 1.846660 | 0.6204 |
| 38 | −61.3213 | 1.6000 | 52.67 | 1.741000 | 0.5460 |
| 39 | 71.8066 | 4.5000 | | | |
| 40 | −469.5278 | 1.6000 | 52.67 | 1.741000 | 0.5460 |
| 41 | 97.9742 | 4.8121 | | | |
| 42 | −845.7711 | 4.0000 | 82.51 | 1.497820 | 0.5390 |
| 43 | −74.5393 | 0.1000 | | | |

TABLE 29-continued

[Eighth example]

| | | | | | |
|---|---|---|---|---|---|
| 44 | 75.8394 | 6.5000 | 60.09 | 1.639999 | 0.5376 |
| 45 | −47.8671 | 1.7000 | 23.78 | 1.846660 | 0.6204 |
| 46 | −1001.2225 | 10.6680 | | | |
| 47 | 0.0000 | 2.0000 | 64.11 | 1.516800 | 0.5357 |
| 48 | 0.0000 | BF | | | |
| Image plane | ∞ | | | | |

[Focal length of lens groups]

| Lens group | First surface | Focal length |
|---|---|---|
| First lens group | 1 | 158.8 |
| Second lens group | 12 | −108.9 |
| Third lens group | 17 | 231.6 |
| Fourth lens group | 19 | −54.5 |
| Fifth lens group | 26 | 113.6 |
| Sixth lens group | 32 | 167.0 |

In the optical system OL8, the tenth surface is the diffractive optical surface. Table 30 below shows data on the diffractive optical surface.

TABLE 30

[Data on diffractive optical surface]

| m | λ0 | n | C2 | C4 |
|---|---|---|---|---|
| 10 | 587.5 | 1.0 | −3.03990E−05 | 8.05326E−10 |

In the optical system OL8, the on-axis air space D0 between the object and the first lens group G1, the on-axis air space D1 between the first lens group G1 and the second lens group G2, the on-axis air space D2 between the second lens group G2 and the third lens group G3, an on-axis air space D3 between the third lens group G3 and the fourth lens group G4, an on-axis air space D4 between the fourth lens group G4 and the fifth lens group G5, an on-axis air space D5 between the fifth lens group G5 and the sixth lens group G6, and the back focal length BF change when changing magnification and when focusing. Table 31 below shows variable distances in the wide-angle end state and the telescopic end state in each of the state of focusing at infinity and the state of focusing at a close distance.

TABLE 31

[Variable distance data]

| State of focusing State of changing magnification | Infinity Wide-angle end | Telescopic end | Close distance Wide-angle end | Telescopic end |
|---|---|---|---|---|
| f | 204.00513 | 391.93795 | — | — |
| β | — | — | −0.13660 | −0.26243 |
| D0 | 0.0000 | 0.0000 | 1599.9999 | 1600.0001 |
| D1 | 52.66350 | 52.66350 | 70.20331 | 70.20331 |
| D2 | 20.90246 | 20.90246 | 3.36266 | 3.36266 |
| D3 | 4.30381 | 58.23908 | 4.30381 | 58.23908 |
| D4 | 27.53863 | 2.51376 | 27.53863 | 2.51376 |
| D5 | 35.09215 | 6.18176 | 35.09215 | 6.18176 |
| BF | 83.19937 | 83.19928 | 83.19941 | 83.19942 |

Table 32 below shows values compliant to the conditional expressions in the optical system OL8. The specific lens Lp in Conditional Expressions (6) and (11) is formed of the biconvex positive lens L13 and the biconvex positive lens L14. In the case of a multifocal lens having a focal length that changes when changing magnification, such as the optical system OL8 according to the eighth example, the values of Conditional Expressions (4) to (10) in the state of focusing at infinity are values in the state of focusing at infinity in the telescopic end state.

TABLE 32

[Values compliant to conditional expressions]

| (1) | θgFp + 0.0017 × vdp = 0.64 |
|---|---|
| (2) | ndp = 1.46 |
| (3) | vdp = 67.8 |
| (4) | TLpf/TL = 0.884 |
| (5) | ω = 3.117° |
| (6) | fp/f = 0.59 |
| (7) | f/fpf = 0.024 |
| (8) | TL/f = 1.02 |
| (9) | (−f2)/f = 0.28 |
| (10) | f1/f = 0.41 |
| (11) | fp/f1 = 1.45 |

As described above, the optical system OL8 satisfies Conditional Expressions (1) to (11) described above.

FIG. 16 shows a spherical aberration diagram, an astigmatism diagram, a distortion diagram, a lateral chromatic aberration diagram, and a coma aberration diagram of the optical system OL8 upon focusing on infinity. The aberration diagrams show that the optical system OL8 allows satisfactory correction of the variety of aberrations and provides excellent imaging performance.

Ninth Embodiment

FIG. 17 shows a configuration of an optical system OL9 according to a ninth example. The optical system OL9 includes a first lens group G1 having positive refractive power, a second lens group G2 having negative refractive power, the aperture stop S, and a third lens group G3 having negative refractive power sequentially arranged from the object side, and when changing focus from infinity to an object at a close distance, the second lens group G2 is moved as the focusing group Gf along the optical axis toward the image side for focusing.

The first lens group G1 includes a biconvex positive lens L11, a positive meniscus lens L12 having a convex surface facing the object side, a biconcave negative lens L13, a positive meniscus lens L14 having a convex surface facing the object side and an image-side lens surface on which an intimate-contact-multilayer diffractive optical element GD made of two different types of material is formed, and a cemented negative lens formed of a negative meniscus lens L15 having a convex surface facing the object side and a positive meniscus lens L16 having a convex surface facing the object side with the lenses L15 and L16 cemented to each other, with the lenses L11 to L16 sequentially arranged from the object side. The second lens group G2 is formed of a cemented negative lens formed of a biconvex positive lens L21 and a biconcave negative lens L22 sequentially arranged from the object side and cemented to each other. The third lens group G3 is formed of a cemented negative lens formed of a biconcave negative lens L31 and a biconvex positive lens L32 cemented to each other, a cemented negative lens formed of a biconvex positive lens L33 and a biconcave negative lens L34 cemented to each other, a biconcave negative lens L35, a cemented positive lens formed of a biconvex positive lens L36 and a negative meniscus lens L37 having a convex surface facing the image side with the lenses L36 and L37 cemented to each other, a cemented negative lens formed of a biconcave negative lens L38 and a biconvex positive lens L39 cemented to each other, and a cemented positive lens formed of a biconvex positive lens L310 and a negative meniscus lens L311 having a convex surface facing the image side with the lenses L310 and L311 cemented to each other, with the lenses L31 to L311 sequentially arranged from the object side. A filter FL is disposed between the third lens group G3 and the image plane I. In the optical system OL9, the specific lens Lp is the positive meniscus lens L12.

The optical system OL9 according to the ninth example is so configured that the cemented negative lens formed of the biconvex positive lens L33 and the biconcave negative lens L34 cemented to each other and the biconcave negative lens L35 in the third lens group G3 form a vibration-proof lens Gvr and the vibration-proof lens Gvr is so moved as to have a displacement component in a direction perpendicular to the optical axis for correction of a change in the image position resulting, for example, from vibration of the optical system OL9.

Table 33 below shows the values of a variety of parameters of the optical system OL9.

TABLE 33

Ninth example
[Overall Parameters]
f = 489.69305
FNO = 5.77468
ω = 2.51316
TL = 280.00580

| [Lens data] | | | | | |
|---|---|---|---|---|---|
| m | r | d | νd | nd | θgF |
| Object plane | ∞ | D0 | | | |
| 1 | 154.7170 | 13.3423 | 70.32 | 1.487490 | 0.5291 |
| 2 | −373.7948 | 0.1000 | | | |
| 3 | 108.5916 | 10.2732 | 95.23 | 1.433848 | 0.5386 |
| 4 | 276.4409 | 4.3514 | | | |
| 5 | −648.1452 | 3.3400 | 38.03 | 1.603420 | 0.5835 |
| 6 | 1153.8182 | 16.2602 | | | |
| 7 | 93.5593 | 9.5000 | 64.13 | 1.516800 | 0.5356 |
| 8 | 182.0193 | 0.2000 | 33.36 | 1.527800 | 0.6291 |
| 9* | 182.0193 | 0.3000 | 49.98 | 1.557147 | 0.5688 |
| 10 | 182.0193 | 7.4326 | | | |
| 11 | 164.0558 | 3.7389 | 40.66 | 1.883000 | 0.5668 |
| 12 | 50.6798 | 9.2324 | 71.34 | 1.569076 | 0.5453 |
| 13 | 225.4712 | D1 | | | |
| 14 | 472.5163 | 3.5000 | 32.18 | 1.672700 | 0.5973 |
| 15 | −320.2508 | 2.0000 | 50.27 | 1.719990 | 0.5527 |
| 16 | 94.1514 | D2 | | | |
| 17 | 0.0000 | 4.6833 | | | Aperture stop |
| 18 | −204.5990 | 1.3000 | 46.59 | 1.816000 | 0.5567 |
| 19 | 48.1309 | 3.9393 | 58.82 | 1.518230 | 0.5449 |
| 20 | −53.1763 | 8.5000 | | | |
| 21 | 55.0000 | 3.6941 | 36.40 | 1.620040 | 0.5878 |
| 22 | −61.1341 | 1.3000 | 82.57 | 1.497820 | 0.5386 |
| 23 | 33.8909 | 3.0000 | | | |
| 24 | −88.8675 | 1.3000 | 67.90 | 1.593190 | 0.5440 |
| 25 | 51.7717 | 5.0000 | | | |
| 26 | 33.6232 | 6.8287 | 40.98 | 1.581440 | 0.5763 |
| 27 | −28.5039 | 1.5000 | 82.57 | 1.497820 | 0.5386 |
| 28 | −1208.1355 | 9.8572 | | | |
| 29 | −43.7623 | 2.0000 | 46.59 | 1.816000 | 0.5567 |
| 30 | 33.7661 | 5.0145 | 44.46 | 1.612660 | 0.5640 |
| 31 | −112.8242 | 0.5000 | | | |

TABLE 33-continued

Ninth example
[Overall Parameters]
f = 489.69305
FNO = 5.77468
ω = 2.51316
TL = 280.00580

| | | | | | |
|---|---|---|---|---|---|
| 32 | 64.9271 | 7.8784 | 40.98 | 1.581440 | 0.5763 |
| 33 | −25.3083 | 2.0000 | 22.74 | 1.808090 | 0.6287 |
| 34 | −105.9897 | 65.6394 | | | |
| 35 | 0.0000 | 2.0000 | 63.88 | 1.516800 | 0.5360 |
| 36 | 0.0000 | 0.0000 | | | |
| Image plane | ∞ | | | | |

[Focal length of lens groups]

| Lens group | First surface | Focal length |
|---|---|---|
| First lens group | 1 | 165.3 |
| Second lens group | 14 | −157.8 |
| Third lens group | 18 | −129.9 |

In the optical system OL9, the ninth surface is the diffractive optical surface. Table 34 below shows data on the diffractive optical surface.

TABLE 34

[Data on diffractive optical surface]

| m | λ0 | n | C2 | C4 |
|---|---|---|---|---|
| 9 | 587.6 | 1.0 | −3.90000E−05 | 3.40226E−10 |

In the optical system OL9, the on-axis air space D0 between the object and the first lens group G1, the on-axis air space D1 between the first lens group G1 and the second lens group G2, the on-axis air space D2 between the second lens group G2 and the third lens group G3, and an on-axis air space BF between the filter FL and the image plane I change when focusing. Table 35 below shows variable distances in the state of focusing at infinity and the state of focusing at a close distance.

TABLE 35

[Variable distance data]

| State of focusing | Infinity | Close distance |
|---|---|---|
| f | 489.69305 | — |
| β | — | −0.18117 |
| D0 | ∞ | 2720.0000 |
| D1 | 27.23120 | 44.04470 |
| D2 | 33.26880 | 16.55530 |
| BF | 0.00000 | 0.02760 |

Table 36 below shows values compliant to the conditional expressions in the optical system OL9. The specific lens Lp in Conditional Expressions (6) and (11) is formed of the positive meniscus lens L12.

TABLE 36

[Values compliant to conditional expressions]

| | |
|---|---|
| (1) | θgFp + 0.0017 × vdp = 0.70 |
| (2) | ndp = 1.43 |

TABLE 36-continued

[Values compliant to conditional expressions]

| | |
|---|---|
| (3) | vdp = 95.23 |
| (4) | TLpf/TL = 0.795 |
| (5) | ω = 2.513° |
| (6) | fp/f = 0.82 |
| (7) | f/fpf = 0.038 |
| (8) | TL/f = 0.57 |
| (9) | (−f2)/f = 0.32 |
| (10) | f1/f = 0.34 |
| (11) | fp/f1 = 2.44 |

As described above, the optical system OL9 satisfies Conditional Expressions (1) to (11) described above.

FIG. 18 shows a spherical aberration diagram, an astigmatism diagram, a distortion diagram, a lateral chromatic aberration diagram, and a coma aberration diagram of the optical system OL9 upon focusing on infinity. The aberration diagrams show that the optical system OL9 allows satisfactory correction of the variety of aberrations and provides excellent imaging performance.

REFERENCE SINGS LIST

1 Camera (optical apparatus)
OL (OL1 to OL9) Optical system
G1 First lens group
G2 Second lens group (Gf focusing group)
G3 Third lens group
Gvr Vibration-proof lens
GD Diffractive optical element
Lp Specific lens
S Aperture stop

The invention claimed is:

1. An optical system comprising:
a first lens group having positive refractive power;
a second lens group having negative refractive power; and
a third lens group
sequentially arranged from an object side,
the second lens group being a focusing group moved along an optical axis to perform focusing, the optical system having a diffractive optical element and at least one lens made of crystalline glass, and satisfying the following conditional expressions:

$$0.40 < TLpf/TL < 0.92$$

$$0.25 < (-f2)/f < 0.70$$

where

TL: overall length of the optical system upon focusing on infinity,

TLpf: on-optical-axis distance from an image plane to a diffractive optical surface of the diffractive optical element upon focusing on infinity, f: focal length of the optical system upon focusing on infinity, and f2: focal length of the second lens group, wherein each of the at least one lens is provided in a position on an object side with respect to the diffractive optical element and satisfies the following conditional expressions:

$$vdp < 90.0$$

$$ndp < 1.47$$

where vdp: Abbe number of a medium of the respective lens at a d line, and ndp: refractive index of a medium of the respective lens at the d line.

2. The optical system according to claim 1, wherein each of the at least one lens satisfies the following conditional expression:

$$\theta gFp + 0.0017 \times vdp < 0.730$$

where

θgFp: partial dispersion ratio of a medium of the respective lens.

3. The optical system according to claim 1, wherein each of the at least one lens satisfies the following conditional expression:

$$\theta gFp + 0.0017 \times vdp < 0.670$$

where

θgFp: partial dispersion ratio of a medium of the respective lens.

4. The optical system according to claim 1, wherein each of the at least one lens satisfies the following conditional expression:

$$vdp < 80.0.$$

5. The optical system according to claim 1, wherein the following conditional expression is satisfied:

$$0.50° < \omega < 6.00°$$

where

ω: half angle of view of the optical system upon focusing on infinity.

6. The optical system according to claim 1, wherein at least one negative lens is provided in a position on an object side with respect to the diffractive optical element.

7. The optical system according to claim 1, wherein the following conditional expression is satisfied:

$$0.20 < fp/f < 1.50$$

where f: focal length of the optical system upon focusing on infinity, and fp: focal length of a lens having a shortest focal length out of the at least one lens.

8. The optical system according to claim 1, wherein the following conditional expression is satisfied:

$$0.00 < f/fpf < 0.10$$

where f: focal length of the optical system upon focusing on infinity, and fpf: focal length of a diffractive optical surface of the diffractive optical element.

9. The optical system according to claim 1, wherein the following conditional expression is satisfied:

$$0.30 < TL/f < 1.50$$

where f: focal length of the optical system upon focusing on infinity.

10. The optical system according to claim 1, wherein at least two lenses made of crystalline glass are provided in positions on an object side with respect to the diffractive optical element.

11. The optical system according to claim 1, wherein each of the at least one lens is disposed on the object side with respect to the focusing group.

12. The optical system according to claim 1, wherein the focusing group moves toward an image side when changing focus from infinity to an object at a close distance.

13. The optical system according to claim 1, wherein the focusing group includes at least one positive lens.

14. The optical system according to claim 1, wherein the third lens group includes a vibration-proof lens that moves in such a way that the vibration-proof lens has a displacement component in a direction perpendicular to an optical axis of the optical system.

15. The optical system according to claim 1, wherein the following conditional expression is satisfied:

$$0.20 < f1/f < 0.55$$

where f: focal length of the optical system upon focusing on infinity, and f1: focal length of the first lens group.

16. The optical system according to claim 1, wherein the following conditional expression is satisfied:

$$0.00 < fp/f1 < 4.00$$

where fp: focal length of a lens having a shortest focal length out of the at least one lens, and f1: focal length of the first lens group.

17. The optical system according to claim 1, wherein the crystalline glass is a crystal material primarily made of silicon dioxide ($SiO_2$).

18. An optical apparatus comprising the optical system according to claim 1.

19. The optical system according to claim 1, wherein a lens made of crystalline glass is disposed in a position closest to an object side.

20. The optical system according to claim 1, including a plurality of lenses made of crystalline glass, and wherein no other lens is interposed within the plurality of lenses.

21. The optical system according to claim 1, wherein the diffractive optical element is disposed on an image plane side of a lens where the diffractive optical element is disposed.

22. The optical system according to claim 21, wherein a lens made of crystalline glass and the lens where the diffractive optical element is disposed are so disposed as to be adjacent to each other.

23. A method for manufacturing an optical system, the method comprising:
- arranging a first lens group having positive refractive power, a second lens group having negative refractive power, and a third lens group sequentially from an object side,
- the second lens group being a focusing group moved along an optical axis to perform focusing, and
- configuring the optical system to have a diffractive optical element and at least one lens made of crystalline glass, and to satisfy the following conditional expressions:

$$0.40 < TLpf/TL < 0.92$$

$$0.25 < (-f2)/f < 0.70$$

where
- TL: overall length of the optical system upon focusing on infinity,
- TLpf: on-optical-axis distance from an image plane to a diffractive optical surface of the diffractive optical element upon focusing on infinity,
- f: focal length of the optical system upon focusing on infinity, and
- f2: focal length of the second lens group, wherein each of the at least one lens is provided in a position on an object side with respect to the diffractive optical element and satisfies the following conditional expressions:

$$vdp < 90.0$$

$$ndp < 1.47$$

where
- vdp: Abbe number of a medium of the respective lens at a d line, and
- ndp: refractive index of a medium of the respective lens at the d line.

\* \* \* \* \*